US011509501B2

(12) United States Patent
Pallas et al.

(10) Patent No.: US 11,509,501 B2
(45) Date of Patent: Nov. 22, 2022

(54) AUTOMATIC PORT VERIFICATION AND POLICY APPLICATION FOR ROGUE DEVICES

(71) Applicant: Cisco Technology, Inc., San Jose, CA (US)

(72) Inventors: Derrick Pallas, San Francisco, CA (US); Matthew Landry, San Rafael, CA (US)

(73) Assignee: Cisco Technology, Inc., San Jose, CA (US)

( * ) Notice: Subject to any disclaimer, the term of this patent is extended or adjusted under 35 U.S.C. 154(b) by 812 days.

(21) Appl. No.: 15/215,023

(22) Filed: Jul. 20, 2016

(65) Prior Publication Data

US 2018/0027020 A1  Jan. 25, 2018

(51) Int. Cl.
  *H04L 29/06* (2006.01)
  *H04L 12/46* (2006.01)
  (Continued)

(52) U.S. Cl.
  CPC ....... *H04L 12/4641* (2013.01); *H04W 12/088* (2021.01); *H04L 47/266* (2013.01); *H04W 12/68* (2021.01); *H04W 88/08* (2013.01)

(58) Field of Classification Search
  CPC . H04L 12/4641; H04L 63/20; H04L 63/1408; H04L 63/1416; H04L 63/1433; H40L 47/2483; H04W 88/08
  (Continued)

(56) References Cited

U.S. PATENT DOCUMENTS 4,298,770 A  11/1981  Nishihara et al.
4,636,919 A   1/1987  Itakura et al.
(Continued)

FOREIGN PATENT DOCUMENTS

CN  103297552  9/2013
CN  104639464  5/2015
(Continued)

OTHER PUBLICATIONS

Beyah, Raheem, Shantanu Kangude, George Yu, Brian Strickland, and John Copeland. "Rogue access point detection using temporal traffic characteristics." In Global Telecommunications Conference, 2004. GLOBECOM'04. IEEE, vol. 4, pp. 2271-2275. IEEE, 2004. (Year: 2004).*

(Continued)

*Primary Examiner* — Luu T Pham
*Assistant Examiner* — Walter J Malinowski
(74) *Attorney, Agent, or Firm* — Polsinelli

(57) ABSTRACT

Systems, methods, and computer-readable storage media for automatic port identification. The present technology can involve determining that a wireless device has connected to a network device on a network, and determining which of the ports on the network device the wireless device has connected to. The determining the port connected to the wireless device can involve determining respective traffic patterns to be provided to selected ports on the network device, determining a traffic pattern transmitted by the wireless device, determining that the traffic pattern transmitted by the wireless device has a similarity to a traffic pattern from the respective traffic patterns, and based on the similarity, determining that a port associated with the traffic pattern is connected to the wireless device. The present technology can also involve selecting a port policy for the port.

20 Claims, 10 Drawing Sheets

(51) Int. Cl.
*H04W 12/088* (2021.01)
*H04W 88/08* (2009.01)
*H04L 47/26* (2022.01)
*H04W 12/68* (2021.01)

(58) Field of Classification Search
USPC ........................ 726/1, 23; 709/224
See application file for complete search history.

(56) References Cited

U.S. PATENT DOCUMENTS

| | | | |
|---|---|---|---|
| 4,700,016 A | 10/1987 | Hitchcock et al. | |
| 5,859,835 A | 1/1999 | Varma et al. | |
| 5,926,458 A | 1/1999 | Yin | |
| 5,983,278 A * | 11/1999 | Chong | H04L 12/5602 370/414 |
| 6,230,231 B1 | 5/2001 | Delong et al. | |
| 6,330,614 B1 * | 12/2001 | Aggarwal | H04L 29/06 370/389 |
| 6,389,031 B1 | 5/2002 | Chao et al. | |
| 6,677,831 B1 | 1/2004 | Cheng et al. | |
| 6,714,553 B1 | 3/2004 | Poole et al. | |
| 6,757,897 B1 | 6/2004 | Shi et al. | |
| 6,769,033 B1 | 7/2004 | Bass et al. | |
| 6,834,139 B1 * | 12/2004 | Prairie | H04L 43/0811 370/216 |
| 6,876,952 B1 | 4/2005 | Kappler et al. | |
| 6,907,039 B2 | 6/2005 | Shen | |
| 6,941,649 B2 | 9/2005 | Goergen et al. | |
| 6,952,421 B1 | 10/2005 | Slater | |
| 6,954,463 B1 | 10/2005 | Ma et al. | |
| 6,996,099 B1 | 2/2006 | Kadambi et al. | |
| 7,068,667 B2 | 6/2006 | Foster et al. | |
| 7,152,117 B1 | 12/2006 | Stapp et al. | |
| 7,177,946 B1 | 2/2007 | Kaluve et al. | |
| 7,181,530 B1 * | 2/2007 | Halasz | H04L 63/0869 709/228 |
| 7,216,161 B1 * | 5/2007 | Peckham | H04L 12/2856 709/224 |
| 7,336,670 B1 * | 2/2008 | Calhoun | H04L 63/10 370/252 |
| 7,372,857 B1 | 5/2008 | Kappler et al. | |
| 7,379,459 B2 | 5/2008 | Ohnishi | |
| 7,411,915 B1 | 8/2008 | Spain et al. | |
| 7,426,604 B1 | 9/2008 | Rygh et al. | |
| 7,463,590 B2 | 12/2008 | Mualem et al. | |
| 7,630,368 B2 | 12/2009 | Tripathi et al. | |
| 7,729,296 B1 | 6/2010 | Choudhary et al. | |
| 7,735,114 B2 * | 6/2010 | Kwan | H04L 63/08 455/410 |
| 7,738,377 B1 * | 6/2010 | Agostino | H04L 43/16 370/233 |
| 7,742,406 B1 | 6/2010 | Muppala | |
| 7,826,469 B1 | 11/2010 | Li et al. | |
| 7,852,748 B2 | 12/2010 | Le Faucheur et al. | |
| 7,940,763 B1 | 5/2011 | Kastenholz | |
| 8,028,160 B1 * | 9/2011 | Orr | H04L 63/1416 709/224 |
| 8,170,025 B2 | 5/2012 | Kloth et al. | |
| 8,190,843 B1 | 5/2012 | De Forest et al. | |
| 8,195,736 B2 | 6/2012 | Malloy et al. | |
| 8,302,301 B2 | 11/2012 | Lau | |
| 8,325,459 B2 | 12/2012 | Mutnury et al. | |
| 8,339,973 B1 | 12/2012 | Pichumani et al. | |
| 8,369,335 B2 | 2/2013 | Jha et al. | |
| 8,411,688 B2 | 4/2013 | Farkas et al. | |
| 8,423,632 B2 | 4/2013 | Yin et al. | |
| 8,509,087 B2 | 8/2013 | Rajagopalan et al. | |
| 8,515,682 B2 * | 8/2013 | Buhler | G06F 19/22 702/19 |
| 8,605,575 B2 | 12/2013 | Gunukula et al. | |
| 8,645,984 B1 * | 2/2014 | Beskrovny | H04N 21/44008 725/22 |
| 8,687,629 B1 | 4/2014 | Kompella et al. | |
| 8,752,175 B2 * | 6/2014 | Porter | H04L 63/1425 713/153 |
| 8,868,766 B1 | 10/2014 | Theimer et al. | |
| 8,874,876 B2 | 10/2014 | Bhadra et al. | |
| 8,934,340 B1 * | 1/2015 | Mater | H04L 49/20 370/230 |
| 8,995,272 B2 | 3/2015 | Agarwal et al. | |
| 9,031,959 B2 * | 5/2015 | Liu | H04L 43/028 707/748 |
| 9,053,070 B1 | 6/2015 | Arguelles | |
| 9,197,553 B2 | 11/2015 | Jain et al. | |
| 9,203,188 B1 | 12/2015 | Siechen et al. | |
| 9,203,753 B2 | 12/2015 | Leung et al. | |
| 9,241,005 B1 * | 1/2016 | Orr | H04L 63/1416 |
| 9,258,195 B1 | 2/2016 | Pendleton et al. | |
| 9,274,710 B1 | 3/2016 | Oikarinen et al. | |
| 9,355,336 B1 * | 5/2016 | Jahagirdar | G06K 9/6217 |
| 9,356,942 B1 * | 5/2016 | Joffe | H04L 63/1408 |
| 9,374,294 B1 | 6/2016 | Pani | |
| 9,402,470 B2 | 8/2016 | Shen et al. | |
| 9,407,501 B2 | 8/2016 | Yadav et al. | |
| 9,414,224 B1 * | 8/2016 | Schmidt | H04W 12/02 |
| 9,433,081 B1 | 8/2016 | Xiong et al. | |
| 9,444,634 B2 | 9/2016 | Pani et al. | |
| 9,502,111 B2 | 11/2016 | Dharmapurikar et al. | |
| 9,509,092 B2 | 11/2016 | Shen et al. | |
| 9,565,202 B1 * | 2/2017 | Kindlund | H04L 63/1441 |
| 9,590,914 B2 | 3/2017 | Alizadeh Attar et al. | |
| 9,602,424 B1 | 3/2017 | Vincent et al. | |
| 9,627,063 B2 | 4/2017 | Dharmapurikar et al. | |
| 9,634,846 B2 | 4/2017 | Pani | |
| 9,635,937 B2 | 5/2017 | Shen et al. | |
| 9,654,300 B2 | 5/2017 | Pani | |
| 9,654,385 B2 | 5/2017 | Chu et al. | |
| 9,654,409 B2 | 5/2017 | Yadav et al. | |
| 9,655,232 B2 | 5/2017 | Saxena et al. | |
| 9,667,431 B2 | 5/2017 | Pani | |
| 9,667,551 B2 | 5/2017 | Edsall et al. | |
| 9,669,459 B2 | 6/2017 | Guthrie et al. | |
| 9,674,086 B2 | 6/2017 | Ma et al. | |
| 9,686,180 B2 | 6/2017 | Chu et al. | |
| 9,698,994 B2 | 7/2017 | Pani | |
| 9,710,407 B2 | 7/2017 | Oikarinen et al. | |
| 9,716,665 B2 | 7/2017 | Alizadeh Attar et al. | |
| 9,729,387 B2 | 8/2017 | Agarwal et al. | |
| 9,742,673 B2 | 8/2017 | Banerjee et al. | |
| 9,755,965 B1 | 9/2017 | Yadav et al. | |
| 9,544,224 B2 | 10/2017 | Chu et al. | |
| 9,806,995 B2 | 10/2017 | Chu et al. | |
| 9,825,857 B2 | 11/2017 | Banerjee et al. | |
| 9,832,122 B2 | 11/2017 | Dharmapurikar et al. | |
| 9,838,248 B1 * | 12/2017 | Grammel | H04L 41/0681 |
| 9,876,711 B2 | 1/2018 | Chu et al. | |
| 10,075,459 B1 * | 9/2018 | Suryanarayanan | H04L 63/1441 |
| 2002/0124107 A1 * | 9/2002 | Goodwin | H04L 12/4641 709/242 |
| 2002/0126671 A1 | 9/2002 | Ellis et al. | |
| 2002/0146026 A1 | 10/2002 | Unitt et al. | |
| 2003/0035385 A1 | 2/2003 | Walsh et al. | |
| 2003/0067924 A1 | 4/2003 | Choe et al. | |
| 2003/0097461 A1 | 5/2003 | Barham et al. | |
| 2003/0115319 A1 | 6/2003 | Dawson et al. | |
| 2003/0123462 A1 | 7/2003 | Kusayanagi | |
| 2003/0137940 A1 | 7/2003 | Schwartz et al. | |
| 2003/0174650 A1 | 9/2003 | Shankar et al. | |
| 2003/0231646 A1 | 12/2003 | Chandra et al. | |
| 2004/0062259 A1 | 4/2004 | Jeffries et al. | |
| 2004/0073715 A1 | 4/2004 | Folkes et al. | |
| 2004/0085974 A1 * | 5/2004 | Mies | H04L 12/42 370/406 |
| 2004/0100901 A1 | 5/2004 | Bellows | |
| 2004/0103310 A1 | 5/2004 | Sobel et al. | |
| 2004/0160956 A1 | 8/2004 | Hardy et al. | |
| 2004/0240562 A1 * | 12/2004 | Bargeron | H04N 7/165 375/240.29 |
| 2004/0249960 A1 | 12/2004 | Hardy et al. | |

(56) References Cited

U.S. PATENT DOCUMENTS

| | | |
|---|---|---|
| 2005/0002386 A1* | 1/2005 | Shiragaki ............ H04Q 11/0005 |
| | | 370/380 |
| 2005/0007961 A1 | 1/2005 | Scott et al. |
| 2005/0013280 A1 | 1/2005 | Buddhikot et al. |
| 2005/0083933 A1 | 4/2005 | Fine et al. |
| 2005/0114541 A1* | 5/2005 | Ghetie .................... H04L 47/10 |
| | | 709/232 |
| 2005/0144290 A1 | 6/2005 | Mallal et al. |
| 2005/0175020 A1 | 8/2005 | Park et al. |
| 2005/0207410 A1 | 9/2005 | Adhikari et al. |
| 2005/0281392 A1* | 12/2005 | Weeks ................ H04L 41/5077 |
| | | 379/22 |
| 2006/0028285 A1 | 2/2006 | Jang et al. |
| 2006/0031643 A1 | 2/2006 | Figueira |
| 2006/0078120 A1* | 4/2006 | Mahendran ......... H04L 63/0428 |
| | | 380/255 |
| 2006/0123481 A1* | 6/2006 | Bhatnagar ........... H04L 63/0236 |
| | | 726/24 |
| 2006/0183488 A1 | 8/2006 | Billhartz |
| 2006/0198315 A1 | 9/2006 | Sasagawa et al. |
| 2006/0200862 A1* | 9/2006 | Olson ................. H04L 63/1433 |
| | | 726/23 |
| 2006/0209688 A1 | 9/2006 | Tsuge et al. |
| 2006/0221835 A1 | 10/2006 | Sweeney et al. |
| 2006/0250982 A1 | 11/2006 | Yuan et al. |
| 2006/0268742 A1 | 11/2006 | Chu et al. |
| 2006/0280179 A1 | 12/2006 | Meier |
| 2007/0006211 A1* | 1/2007 | Venkiteswaran ..... G06F 9/4408 |
| | | 717/168 |
| 2007/0025241 A1 | 2/2007 | Nadeau et al. |
| 2007/0083913 A1* | 4/2007 | Griffin .................... G06F 21/56 |
| | | 726/3 |
| 2007/0104198 A1 | 5/2007 | Kalluri et al. |
| 2007/0133566 A1 | 6/2007 | Copps |
| 2007/0165627 A1* | 7/2007 | Sultan .................... H04L 12/14 |
| | | 370/389 |
| 2007/0223372 A1 | 9/2007 | Haalen et al. |
| 2007/0274229 A1 | 11/2007 | Scholl et al. |
| 2007/0280264 A1 | 12/2007 | Milton et al. |
| 2008/0031130 A1 | 2/2008 | Raj et al. |
| 2008/0031247 A1 | 2/2008 | Tahara et al. |
| 2008/0057913 A1* | 3/2008 | Sinha ................. H04L 63/1416 |
| | | 455/414.1 |
| 2008/0092213 A1 | 4/2008 | Wei et al. |
| 2008/0120691 A1* | 5/2008 | Flewallen ............... H04L 47/10 |
| | | 726/1 |
| 2008/0147830 A1 | 6/2008 | Ridgill et al. |
| 2008/0151863 A1 | 6/2008 | Lawrence et al. |
| 2008/0177896 A1 | 7/2008 | Quinn et al. |
| 2008/0196100 A1* | 8/2008 | Madhavan .......... H04L 63/1408 |
| | | 726/22 |
| 2008/0196102 A1* | 8/2008 | Roesch .................... G06F 21/55 |
| | | 726/23 |
| 2008/0225853 A1 | 9/2008 | Melman et al. |
| 2008/0243495 A1 | 10/2008 | Anandakumar et al. |
| 2008/0253366 A1 | 10/2008 | Zuk et al. |
| 2008/0253556 A1* | 10/2008 | Cobb ...................... H04Q 1/136 |
| | | 379/442 |
| 2008/0263665 A1* | 10/2008 | Ma ......................... G06F 21/552 |
| | | 726/23 |
| 2008/0298330 A1* | 12/2008 | Leitch ...................... H04W 4/02 |
| | | 370/338 |
| 2008/0298360 A1 | 12/2008 | Wijnands et al. |
| 2008/0310421 A1 | 12/2008 | Teisberg et al. |
| 2009/0010153 A1 | 1/2009 | Filsfils et al. |
| 2009/0044005 A1 | 2/2009 | Komura et al. |
| 2009/0086629 A1 | 4/2009 | Zhang et al. |
| 2009/0094357 A1 | 4/2009 | Keohane et al. |
| 2009/0103566 A1 | 4/2009 | Kloth et al. |
| 2009/0106838 A1* | 4/2009 | Clark ................... H04L 63/1408 |
| | | 726/23 |
| 2009/0122805 A1 | 5/2009 | Epps et al. |
| 2009/0144680 A1* | 6/2009 | Lehavot .............. G06F 17/5081 |
| | | 716/106 |
| 2009/0188711 A1 | 7/2009 | Ahmad |
| 2009/0193103 A1 | 7/2009 | Small et al. |
| 2009/0232011 A1 | 9/2009 | Li et al. |
| 2009/0238179 A1 | 9/2009 | Samprathi |
| 2009/0249096 A1* | 10/2009 | Conner .................... G06F 1/32 |
| | | 713/320 |
| 2009/0268614 A1 | 10/2009 | Tay et al. |
| 2009/0268617 A1* | 10/2009 | Wei ........................ G06F 21/554 |
| | | 370/241 |
| 2010/0128619 A1 | 5/2010 | Shigei |
| 2010/0150155 A1 | 6/2010 | Napierala |
| 2010/0191813 A1 | 7/2010 | Gandhewar et al. |
| 2010/0191839 A1 | 7/2010 | Gandhewar et al. |
| 2010/0223655 A1 | 9/2010 | Zheng |
| 2010/0265849 A1 | 10/2010 | Harel |
| 2010/0281155 A1 | 11/2010 | Cipollone et al. |
| 2010/0287227 A1 | 11/2010 | Goel et al. |
| 2010/0290472 A1 | 11/2010 | Raman et al. |
| 2010/0299553 A1 | 11/2010 | Cen |
| 2010/0312875 A1 | 12/2010 | Wilerson et al. |
| 2011/0002339 A1* | 1/2011 | Fok ................... H04L 29/12481 |
| | | 370/401 |
| 2011/0007638 A1 | 1/2011 | Xu et al. |
| 2011/0110241 A1 | 5/2011 | Atkinson et al. |
| 2011/0138310 A1 | 6/2011 | Gomez et al. |
| 2011/0153722 A1 | 6/2011 | Choudhary et al. |
| 2011/0158248 A1 | 6/2011 | Vorunganti et al. |
| 2011/0170426 A1 | 7/2011 | Kompella et al. |
| 2011/0173699 A1* | 7/2011 | Figlin ................. H04L 63/1408 |
| | | 726/23 |
| 2011/0185073 A1 | 7/2011 | Jagadeeswaran et al. |
| 2011/0203834 A1 | 8/2011 | Yoneya et al. |
| 2011/0211578 A1 | 9/2011 | Zwiebel et al. |
| 2011/0213894 A1 | 9/2011 | Silberstein et al. |
| 2011/0219452 A1* | 9/2011 | Porter ................. H04L 63/1425 |
| | | 726/23 |
| 2011/0228795 A1 | 9/2011 | Agrawal et al. |
| 2011/0239273 A1* | 9/2011 | Yang ...................... G06F 21/577 |
| | | 726/3 |
| 2011/0249682 A1 | 10/2011 | Kean et al. |
| 2011/0268118 A1 | 11/2011 | Schlansker et al. |
| 2011/0271319 A1* | 11/2011 | Venable, Sr. ............ H04L 41/12 |
| | | 726/1 |
| 2011/0273990 A1 | 11/2011 | Rajagopalan et al. |
| 2011/0274053 A1 | 11/2011 | Baik et al. |
| 2011/0286324 A1 | 11/2011 | Bellagamba et al. |
| 2011/0286447 A1 | 11/2011 | Liu |
| 2011/0299406 A1 | 12/2011 | Vobbilisetty et al. |
| 2011/0310894 A1 | 12/2011 | Lee et al. |
| 2011/0321031 A1 | 12/2011 | Dournov et al. |
| 2012/0007688 A1 | 1/2012 | Zhou et al. |
| 2012/0063318 A1 | 3/2012 | Boddu et al. |
| 2012/0102114 A1 | 4/2012 | Dunn et al. |
| 2012/0163164 A1 | 6/2012 | Terry et al. |
| 2012/0163396 A1 | 6/2012 | Cheng et al. |
| 2012/0218896 A1* | 8/2012 | Ygberg ................ H04L 41/0816 |
| | | 370/235 |
| 2012/0246307 A1 | 9/2012 | Malloy et al. |
| 2012/0275304 A1 | 11/2012 | Patel et al. |
| 2012/0300787 A1 | 11/2012 | Korger |
| 2012/0311621 A1 | 12/2012 | Foster et al. |
| 2013/0003732 A1 | 1/2013 | Dholakia et al. |
| 2013/0007879 A1* | 1/2013 | Esteban .............. H04L 63/1416 |
| | | 726/22 |
| 2013/0019277 A1* | 1/2013 | Chang ................. H04L 63/0218 |
| | | 726/1 |
| 2013/0055155 A1 | 2/2013 | Wong et al. |
| 2013/0090014 A1 | 4/2013 | Champion |
| 2013/0097335 A1 | 4/2013 | Jiang et al. |
| 2013/0100810 A1 | 4/2013 | Slothouber |
| 2013/0107889 A1 | 5/2013 | Barabash et al. |
| 2013/0121172 A1 | 5/2013 | Cheng et al. |
| 2013/0122825 A1* | 5/2013 | Deforge ............... H04B 17/0085 |
| | | 455/73 |
| 2013/0124708 A1 | 5/2013 | Lee et al. |
| 2013/0155846 A1 | 6/2013 | Ramachandran et al. |

(56) References Cited

U.S. PATENT DOCUMENTS

| | | | |
|---|---|---|---|
| 2013/0182712 A1 | 7/2013 | Aguayo et al. | |
| 2013/0242795 A1* | 9/2013 | Heen | H04L 63/1425 370/252 |
| 2013/0250951 A1 | 9/2013 | Koganti et al. | |
| 2013/0307670 A1* | 11/2013 | Ramaci | G06F 21/6245 340/5.82 |
| 2013/0311637 A1 | 11/2013 | Kamath et al. | |
| 2013/0311663 A1 | 11/2013 | Kamath et al. | |
| 2013/0311991 A1 | 11/2013 | Li et al. | |
| 2013/0322258 A1 | 12/2013 | Nedeltchev et al. | |
| 2013/0322446 A1 | 12/2013 | Biswas et al. | |
| 2013/0322453 A1 | 12/2013 | Allan | |
| 2013/0332399 A1 | 12/2013 | Reddy et al. | |
| 2013/0332577 A1 | 12/2013 | Nakil et al. | |
| 2013/0332602 A1 | 12/2013 | Nakil et al. | |
| 2013/0347105 A1* | 12/2013 | Neumann | H04L 63/1441 726/22 |
| 2014/0016501 A1 | 1/2014 | Kamath et al. | |
| 2014/0047264 A1 | 2/2014 | Wang et al. | |
| 2014/0052852 A1* | 2/2014 | Dufour | H04L 43/10 709/224 |
| 2014/0056298 A1 | 2/2014 | Vobbilisetty et al. | |
| 2014/0064278 A1 | 3/2014 | Santos et al. | |
| 2014/0068750 A1 | 3/2014 | Tjahjono et al. | |
| 2014/0086253 A1 | 3/2014 | Yong | |
| 2014/0105039 A1 | 4/2014 | Mcdysan | |
| 2014/0105062 A1 | 4/2014 | Mcdysan et al. | |
| 2014/0105216 A1 | 4/2014 | Mcdysan | |
| 2014/0146817 A1 | 5/2014 | Zhang | |
| 2014/0146824 A1 | 5/2014 | Angst et al. | |
| 2014/0201375 A1 | 7/2014 | Beereddy et al. | |
| 2014/0219275 A1 | 8/2014 | Allan et al. | |
| 2014/0241353 A1 | 8/2014 | Zhang et al. | |
| 2014/0244779 A1 | 8/2014 | Roitshtein et al. | |
| 2014/0258465 A1 | 9/2014 | Li | |
| 2014/0269705 A1 | 9/2014 | Decusatis et al. | |
| 2014/0269710 A1 | 9/2014 | Sundaram et al. | |
| 2014/0269712 A1 | 9/2014 | Kidambi et al. | |
| 2014/0280272 A1* | 9/2014 | Choque | H04L 63/102 707/758 |
| 2014/0280846 A1* | 9/2014 | Gourlay | H04L 63/101 709/223 |
| 2014/0294005 A1 | 10/2014 | Jain et al. | |
| 2014/0307744 A1 | 10/2014 | Dunbar et al. | |
| 2014/0321277 A1 | 10/2014 | Lynn, Jr. et al. | |
| 2014/0334295 A1 | 11/2014 | Guichard et al. | |
| 2014/0334304 A1* | 11/2014 | Zang | H04L 47/2441 370/235 |
| 2014/0334317 A1* | 11/2014 | Atreya | H04L 63/14 370/252 |
| 2014/0341029 A1 | 11/2014 | Allan et al. | |
| 2014/0372582 A1 | 12/2014 | Ghanwani et al. | |
| 2015/0009992 A1 | 1/2015 | Zhang | |
| 2015/0058470 A1 | 2/2015 | Duda | |
| 2015/0073920 A1 | 3/2015 | Pashkevich et al. | |
| 2015/0082418 A1 | 3/2015 | Gu | |
| 2015/0092551 A1 | 4/2015 | Moisand et al. | |
| 2015/0092593 A1 | 4/2015 | Kompella et al. | |
| 2015/0103679 A1 | 4/2015 | Tessmer et al. | |
| 2015/0113143 A1 | 4/2015 | Stuart et al. | |
| 2015/0124629 A1 | 5/2015 | Pani et al. | |
| 2015/0124644 A1 | 5/2015 | Pani | |
| 2015/0124806 A1 | 5/2015 | Banerjee et al. | |
| 2015/0124823 A1 | 5/2015 | Pani et al. | |
| 2015/0124824 A1 | 5/2015 | Edsall et al. | |
| 2015/0124833 A1 | 5/2015 | Ma et al. | |
| 2015/0131445 A1* | 5/2015 | Nie | H04L 47/2483 370/235 |
| 2015/0133201 A1* | 5/2015 | Szabo | H04W 52/0258 455/573 |
| 2015/0188769 A1 | 7/2015 | Gu | |
| 2015/0188770 A1* | 7/2015 | Naiksatam | H04L 41/0893 370/254 |
| 2015/0222516 A1 | 8/2015 | Deval et al. | |
| 2015/0236900 A1 | 8/2015 | Chung et al. | |
| 2015/0249608 A1* | 9/2015 | Zhang | H04L 47/125 709/226 |
| 2015/0271104 A1 | 9/2015 | Chikkamath et al. | |
| 2015/0280959 A1 | 10/2015 | Vincent | |
| 2015/0288709 A1* | 10/2015 | Singhal | H04L 63/102 726/23 |
| 2015/0334632 A1* | 11/2015 | Rudolph | H04W 48/02 726/4 |
| 2015/0378712 A1 | 12/2015 | Cameron et al. | |
| 2015/0378969 A1 | 12/2015 | Powell et al. | |
| 2016/0006664 A1* | 1/2016 | Sabato | H04L 47/6265 370/235 |
| 2016/0080350 A1 | 3/2016 | Chaturvedi et al. | |
| 2016/0119204 A1 | 4/2016 | Murasato et al. | |
| 2016/0134563 A1 | 5/2016 | Yu et al. | |
| 2016/0149751 A1 | 5/2016 | Pani et al. | |
| 2016/0173511 A1* | 6/2016 | Brats | H04L 41/145 726/23 |
| 2016/0205069 A1* | 7/2016 | Blocher | H04L 63/02 726/12 |
| 2016/0255118 A1* | 9/2016 | Wang | H04L 63/1441 726/1 |
| 2016/0261894 A1* | 9/2016 | Li | H04N 21/23418 |
| 2016/0277299 A1* | 9/2016 | Kadaba | H04L 12/56 |
| 2016/0315811 A1 | 10/2016 | Yadav et al. | |
| 2017/0034161 A1* | 2/2017 | Isola | G06F 21/577 |
| 2017/0039267 A1* | 2/2017 | Shmiel | G06F 16/2455 |
| 2017/0104636 A1 | 4/2017 | Vora et al. | |
| 2017/0111360 A1* | 4/2017 | Hooda | H04W 12/12 |
| 2017/0126718 A1* | 5/2017 | Baradaran | H04L 63/1425 |
| 2017/0142207 A1* | 5/2017 | Gupta | H04L 67/16 |
| 2017/0149637 A1* | 5/2017 | Banikazemi | H04L 43/08 |
| 2017/0163491 A1* | 6/2017 | Tonouchi | H04L 41/12 |
| 2017/0207961 A1 | 7/2017 | Saxena et al. | |
| 2017/0214619 A1 | 7/2017 | Chu et al. | |
| 2017/0222898 A1* | 8/2017 | Acharya | H04L 43/08 |
| 2017/0237651 A1 | 8/2017 | Pani | |
| 2017/0237667 A1* | 8/2017 | Wang | H04L 45/7457 709/226 |
| 2017/0237678 A1 | 8/2017 | Ma et al. | |
| 2017/0250912 A1 | 8/2017 | Chu et al. | |
| 2017/0257260 A1 | 9/2017 | Govindan et al. | |
| 2017/0288948 A1 | 10/2017 | Singh et al. | |
| 2017/0294088 A1* | 10/2017 | Patterson | G08B 13/08 |

FOREIGN PATENT DOCUMENTS

| | | | | |
|---|---|---|---|---|
| EP | | 2431883 A2 * | 3/2012 | G06F 13/102 |
| EP | | 2621136 | 7/2013 | |
| EP | | 3208721 A8 * | 10/2017 | |
| JP | | 2006148255 A * | 6/2006 | |
| JP | | 2007267074 A * | 10/2007 | |
| WO | WO 2014/071996 | | 5/2014 | |

OTHER PUBLICATIONS

Kao, Kuo-Fong, Tau-Heng Yeo, Wai-Shuen Yong, and Hui-Hsuan Chen. "A location-aware rogue AP detection system based on wireless packet sniffing of sensor APs." In Proceedings of the 2011 ACM Symposium on Applied Computing, pp. 32-36. ACM, 2011 (Year: 2011).*

Cheng, Mu, Huang Xiaohong, Wu Jun, and Ma Yan. "Network traffic signature generation mechanism using principal component analysis." China Communications 10, No. 11 (2013): 95-106. (Year: 2013).*

Wooley, George L. "Results of classroom enterprise security assessment of five large enterprise networks." Journal of Computing Sciences in Colleges 18, No. 3 (2003): 185-195. (Year: 2003).*

Goss, Ryan, and Reinhardt Botha. "Deep packet inspection—Fear of the unknown." In 2010 Information Security for South Africa, pp. 1-5. IEEE, 2010. (Year: 2010).*

Nishiyama, Hiroki, Desmond Fomo, Zubair Md Fadlullah, and Nei Kato. "Traffic pattern-based content leakage detection for trusted content delivery networks." IEEE Transactions on Parallel and Distributed Systems 25, No. 2 (2013): 301-309. (Year: 2013).*

(56) References Cited

OTHER PUBLICATIONS

Kavitha, P., and M. Usha. "Detecting anomalies in WLAN using discrimination algorithm." In 2013 Fourth International Conference on Computing, Communications and Networking Technologies (ICCCNT), pp. 1-6. IEEE, 2013. (Year: 2013).*
Abdo, E., "HOST_ID TCP Options: Implementation & Preliminary Test Results," Network Working Group Internet Draft draft-abdo-hostid-tcpopt-implementation-03, Jul. 16, 2012, 30 pages; http://tools.ietf.org/pdf/draft-abdo-hostid-tcpopt-implementation-03.pdf.
Boucadair, M., et al., "Analysis of Solution Candidates to Reveal a Host Identifier (Host ID) in Shared Address Deployments," IETF INTAREA WG Internet-Draft draft-ietf-intarea-nat-reveal-analysis-05, Feb. 14, 2013, 22 pages.
Brocade Communications Systems, Inc., "Multi-Chassis Trunking for Resilient and High-Performance Network Architectures," White Paper, www_brocade.com, 2010, 8 pages.
Cisco Systems, Inc. "Intermediate System-to-Intermediate System (IS-IS) TLVs, Document ID 5739," updated Aug. 10, 2005, 7 pages.
Cisco Systems, Inc., "Chapter 2: Virtual Port Channel Operations," Cisco Nexus 5000 Series NX-OS Operations Guide, Release 5.0(3)N2(1), Jun. 11, 2012, 18 pages.
Cisco Systems, Inc., "Cisco Nexus 1000V VXLAN Configuration Guide, Release 4.2(1)SV2(2.1), Chapter 1, Information About VXLANs," Jun. 21, 2013, 6 pages.
Cisco Systems, Inc., "Design and Configuration Guide: Best Practices for Virtual Port Channels (vPC) on Cisco Nexus 7000 Series Switches," Revised Aug. 2014, 116 pages.
Cisco, "Cisco Fabric Path for Cisco Nexus 7000 Series Switches," White Paper, Sep. 7, 2011, 44 pages.
Cisco, "Cisco Fabric Path," At-A-Glance, 2010, 2 pages.
Cisco, "Cisco FabricPath Design Guide: Using Fabric Path with an Aggregation and Access Topology," Dec. 2011, 53 pages.
Eastlake, D., et al., "Routing Bridges (RBridges): Adjacency," IETF, RFC 6327, Jul. 2011, 27 pages.
Eastlake, D., et al., "Transparent Interconnection of Lots of Links (TRILL) Use of IS-IS," IETF, RFC 6326, Jul. 2011, 26 pages.
Eastlake, Donald, et al., "RBridges: TRILL Header Options," <draft-ietf-trill-rbridge-options-00.txt>, TRILL Working Group, Internet-Draft, Dec. 24, 2009, 18 pages.
Eastlake, Eastlake, et al., "RBridges: Further TRILL Header Options," <draft-ietf-trill-rbrige-options-06.txt>, TRILL Working Group, Internet Draft, Dec. 1, 2011, 20 pages.
Leiserson, Charles E., "Fat-Trees: Universal Networks for Hardware-Efficient Supercomputing," IEEE Transactions on Computers, vol. c-34, No. 10, Oct. 1985, 10 pages.
Onisick, Joe, "VXLAN Deep Dive," Genesis Framework, Wordpress, Nov. 6, 2012, 8 pages.
Perlman, R., et al., "Routing Bridges (RBridges): Base Protocol Specification," IETF, RFC 6325, Jul. 2011, 100 pages.
Perlman, Radia, et al., "Introduction to TRILL," The Internet Protocol Journal, vol. 14, No. 3, Sep. 2011, 19 pages.
Schaumann, Jan, "L3DSR—Overcoming Layer 2 Limitations of Direct Server Return Load Balancing," NANOG 51, Miami, Jan. 30, 2011, 33 pages.
Spijker, Rick Van't, "Dissertation Module for Master of Science—Mobile and Distributed Computer Networks," Leeds Metropolitan University, May 31, 2010, pp. 1-78.
Touch, J., et al., "Transparent Interconnection of Lots of Links (TRILL): Problem and Applicability Statement," Network Working Group, RFC 5556, May 2009, 18 pages.
VMware, Inc., "VMware Network Virtualization Design Guide, Technical White Paper," Jan. 2013, 25 pages.
Wikipedia®, "X-Forwarded-For," retrieved and printed from Internet Mar. 9, 2018, 4 pages; http://en.wikipedia.org/w/index.php?title=X-Forwarded-For&oldid=542207414.
Yourtchenko, D., et al., "Revealing hosts sharing an IP address using TCP option," Network Working Group Internet Draftdraft-wing-nat-reveal-option-03.txt, Dec. 8, 2011, 10 pages.

* cited by examiner

AUTOMATIC PORT VERIFICATION AND POLICY APPLICATION FOR ROGUE DEVICES

TECHNICAL FIELD

The present technology pertains to network security, and more specifically, the present technology involves identifying rogue devices connected to the network.

BACKGROUND

Unauthorized or rogue computing devices, such as access points, when connected to a network can pose significant security threats to the network. For example, rogue devices can be used to gain unauthorized access to the network, steal sensitive information from the network, snoop traffic in the network, execute commands over the network, disrupt the network, etc. The damages or consequences to the network and organization victimized by an unauthorized user or hacker can be significant. Unfortunately, as the networks grow in size and complexity, it becomes increasingly difficult to identify when and where a rogue device has connected to the network. As a result, it can be extremely difficult to protect the network, prevent unauthorized access and intrusion by rogue devices, and respond to unauthorized connections in a timely and effective manner.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which.

DESCRIPTION OF EXAMPLE EMBODIMENTS

Figure 1A:
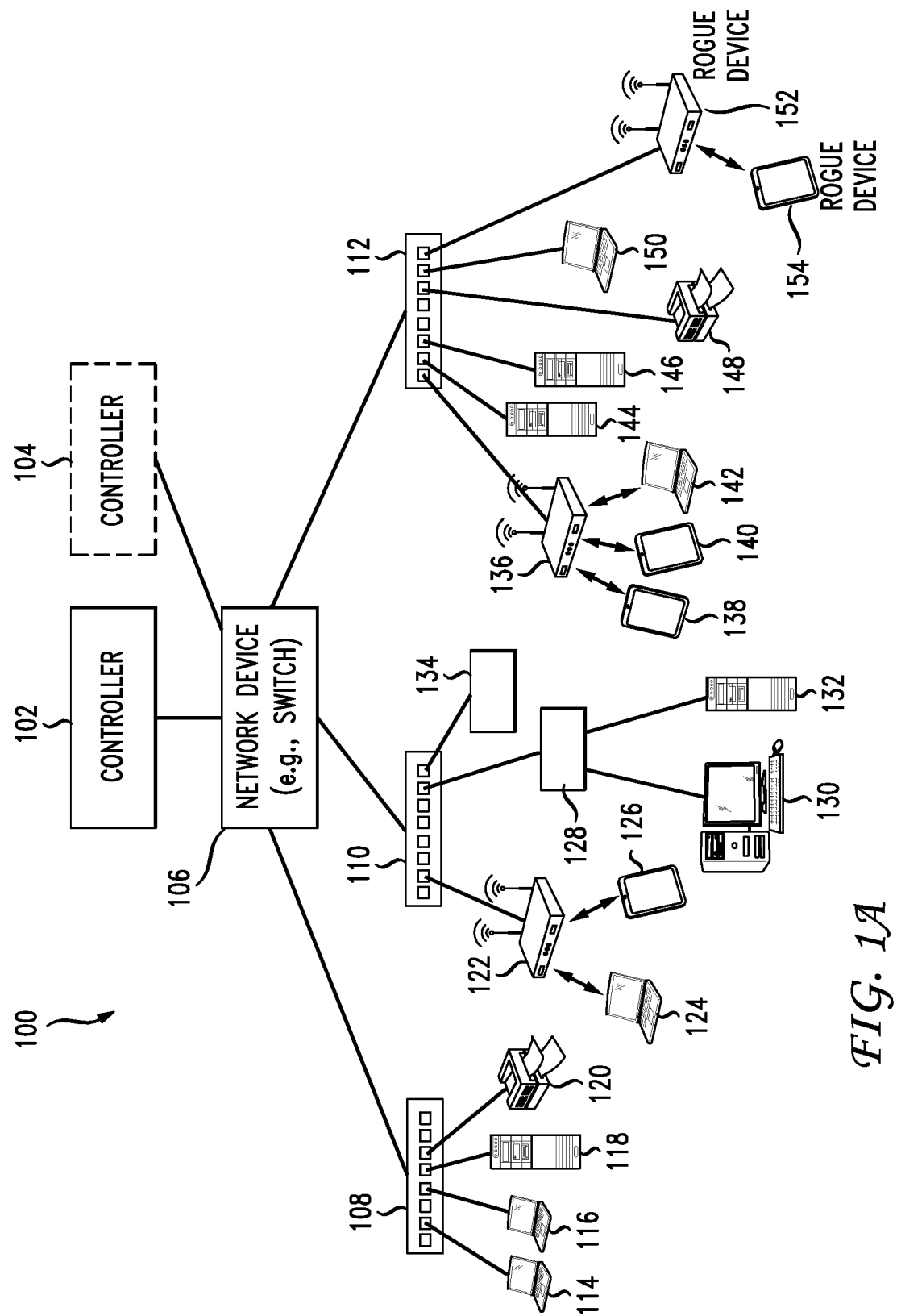
FIG. 1A and FIG. 1B illustrate schematic diagrams of example network environments for rogue device detection and port identification.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

Overview

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

The approaches set forth herein can enable accurate and efficient identification and validation of a wired port that has been connected to a rogue device, such as a rogue access point. It is typically extremely difficult to identify with any certainty which port specifically a rogue device has plugged into. Advantageously, the approaches herein can not only detect when a rogue device is connected to the network but also which specific port the rogue device has connected to. Once the wired port is identified with a predetermined confidence level, a policy can be automatically applied to the wired port to limit or block access of the rogue device to the wired port and network. This can prevent the rogue device from accessing the network or otherwise gaining unauthorized access to network data and resources. When the rogue device is later disconnected from the wired port, the policy applied to the wired port can be reset, thus preventing future denial of service to a non-rogue device that is subsequently connected to the port.

Disclosed are systems, methods, and computer-readable storage media for identifying and validating switch ports connected to rogue devices. In some cases, a system can determine that a rogue device has connected to a port on a network device in a network. The system can then determine which of the ports on the network device is connected to the rogue device. The system can determine which of the ports on the network device is connected to the rogue device in various ways.

In some examples, the system can determine one or more predetermined traffic patterns to be provided by the network device to selected ports one the network device. The selected ports can obtain the one or more predetermined traffic patterns and transmit or provide the one or more predetermined traffic patterns to any devices connected to the selected ports. This can cause such devices to broadcast or transmit the one or more predetermined traffic patterns. Thus, if the rogue device is connected to a particular port from the selected ports, the rogue device can be triggered to broadcast or wirelessly transmit traffic according to the one or more predetermined traffic patterns.

The system can determine or detect one or more traffic patterns transmitted by the rogue device. For example, the system can capture or receive a forwarded copy of traffic transmitted by the rogue device and determine that the rogue device transmitted the one or more traffic patterns. In some examples, a wireless device, such as an access point or a laptop, can capture the traffic transmitted by the rogue device. The wireless device can then forward the traffic to the system or report the traffic pattern to the system. The system can accordingly determine the traffic patterns transmitted by the rogue device.

The system can determine that the one or more traffic patterns transmitted by the rogue device has a threshold degree of similarity to a traffic pattern from the one or more predetermined traffic patterns. Based on the threshold degree of similarity to the traffic pattern, the system can determine that a port associated with the traffic pattern is connected to the rogue device.

The system can also select a port policy to be applied to the identified port. The port policy can be a restrictive or security port policy selected for the rogue device. The port policy can modify the operation(s) of the identified port. For example, the policy can modify the throughput of the identified port, reduce the power of the identified port, disable the identified port, apply one or more rules to traffic associated with the identified port, isolate traffic associated with the identified port (e.g., assign such traffic to an isolated network or segment such as a virtual local area network, etc.), etc.

The system can also perform verification tests. For example, the system can apply specific port policies to one or more ports, including the identified port. The specific port policies can cause the one or more ports to provide specific traffic patterns to any devices connected to those ports. The specific traffic patterns can be the same for all the one or more ports or can vary as will be further explained. The specific traffic patterns can be compared with the traffic patterns transmitted by the rogue device to obtain a confidence level for the identified port. The confidence level can increase as the degree of similarity between the traffic pattern transmitted by the rogue device and the traffic pattern associated with the identified port increases, the degree of similarity between the traffic pattern by the rogue device and the traffic patterns associated with other ports on the network device decreases, the complexity or uniqueness of the traffic patterns used to identify and verify the port connected to the rogue device increase, the number of verification tests increase, etc.

DESCRIPTION

The disclosed technology addresses the need in the art for mechanisms to accurately and efficiently detect when a rogue device has connected to the network and identify which specific wired port is connected to the rogue device. The present technology involves system, methods, and computer-readable media for efficiently detecting when a rogue device has connected to the network and accurately identifying which wired port on the network is connected to the rogue device.

Figure 1B:
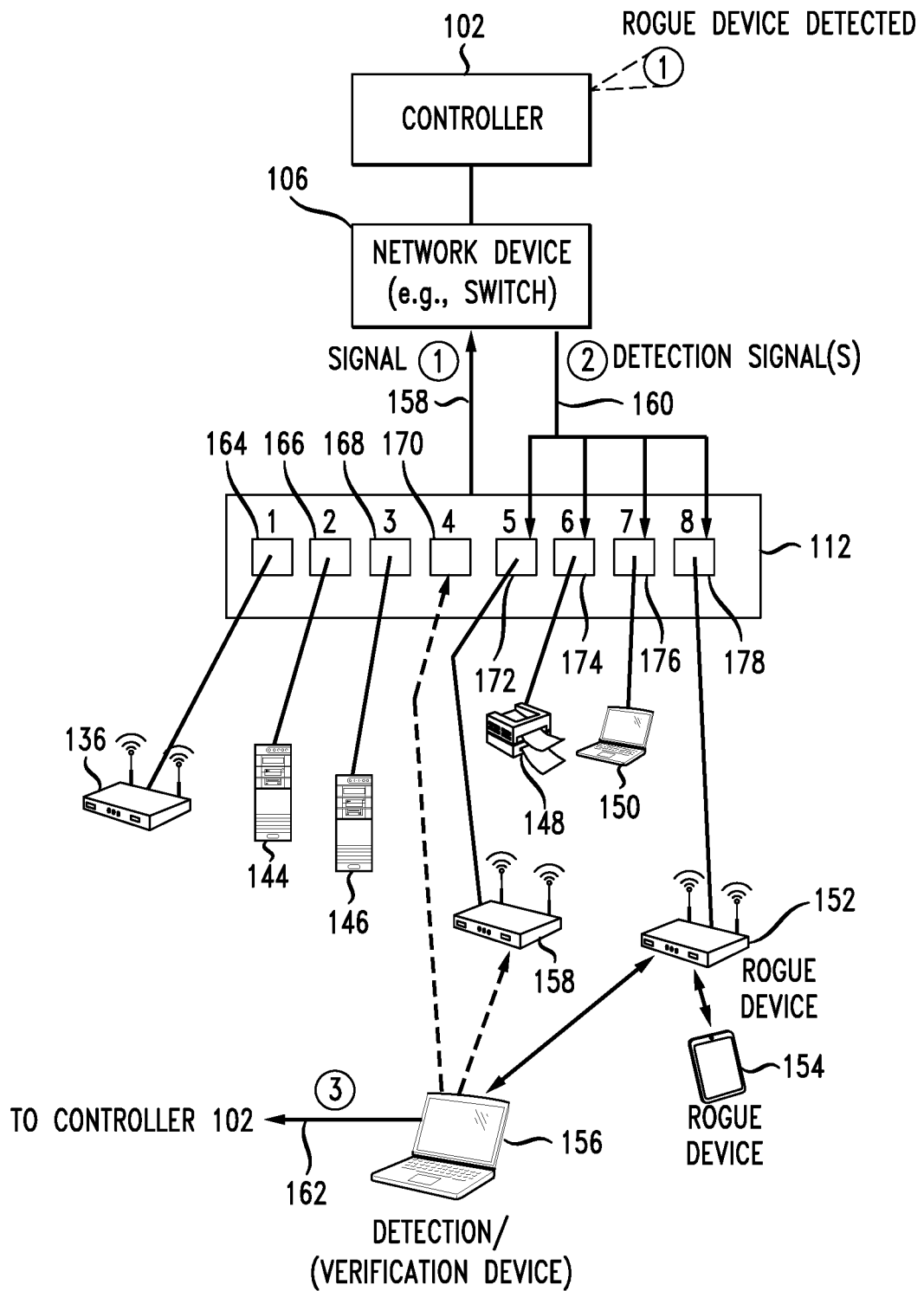
Figure 2:
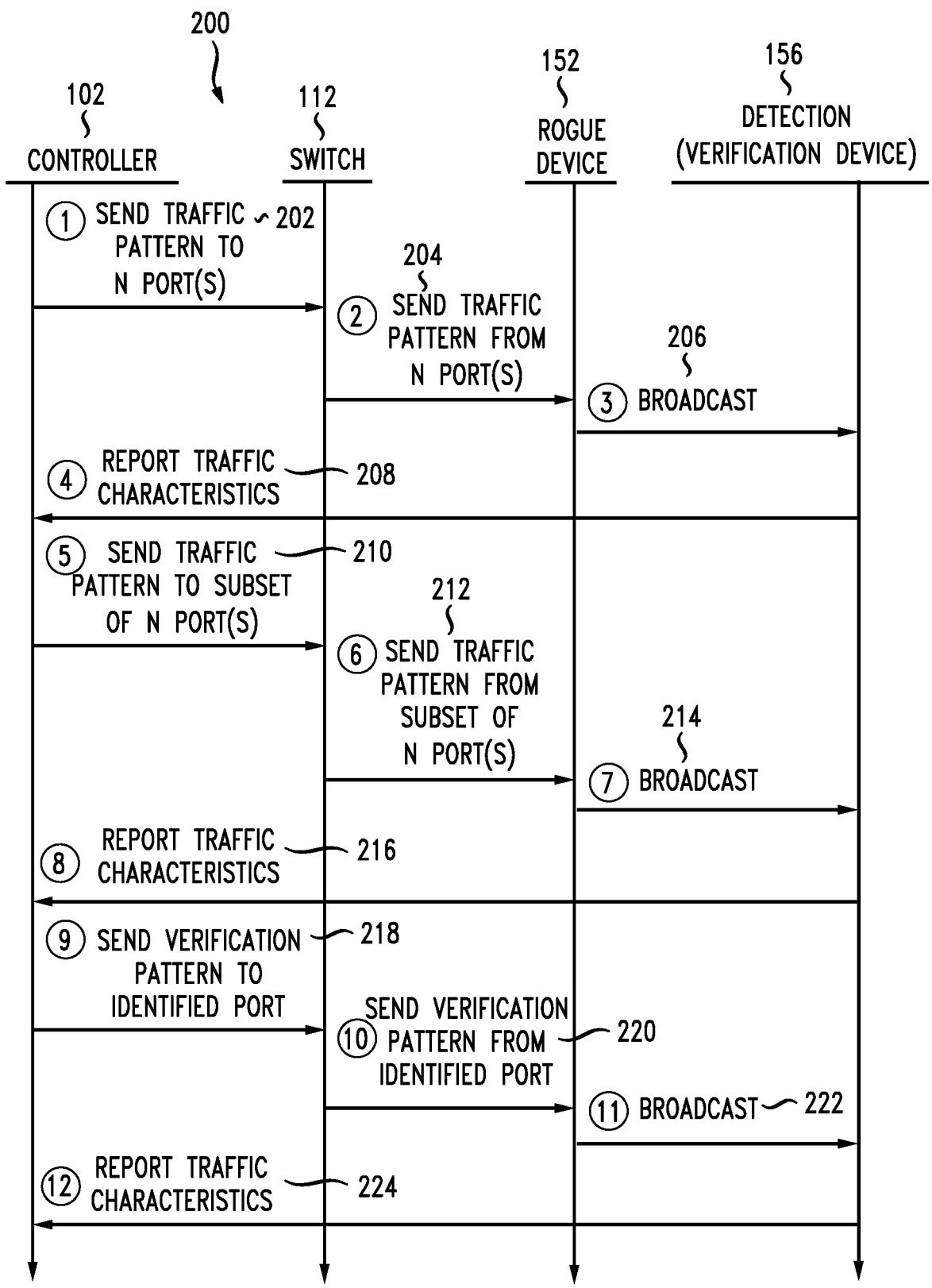
FIG. 2 illustrates a diagram of an example process for automatic port identification.
Figure 5:
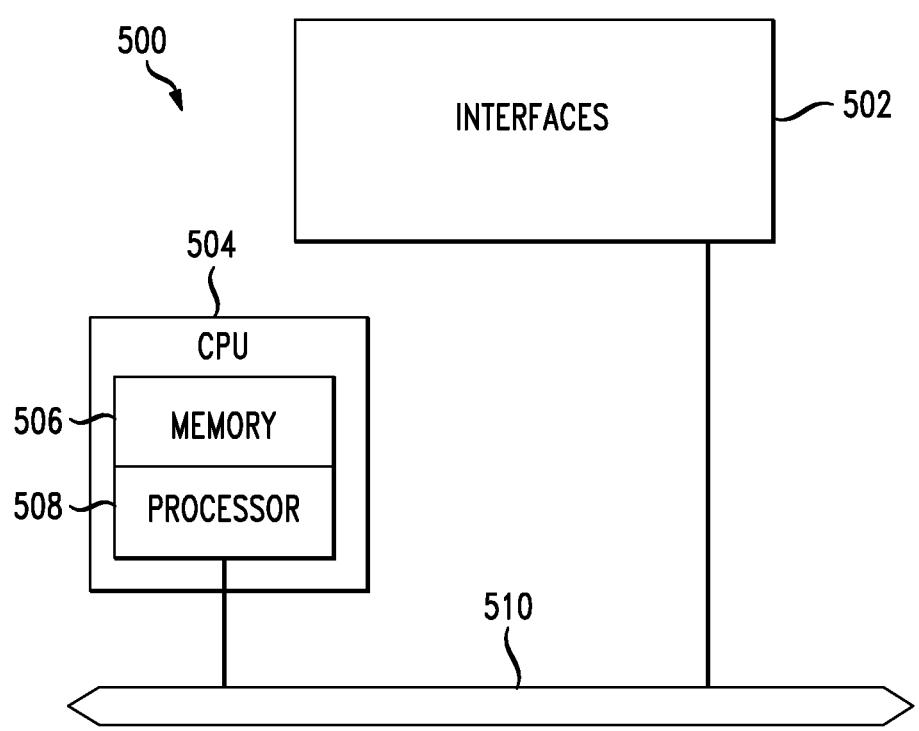
FIG. 5 illustrates an example network device in accordance with various embodiments.
Figure 6A:
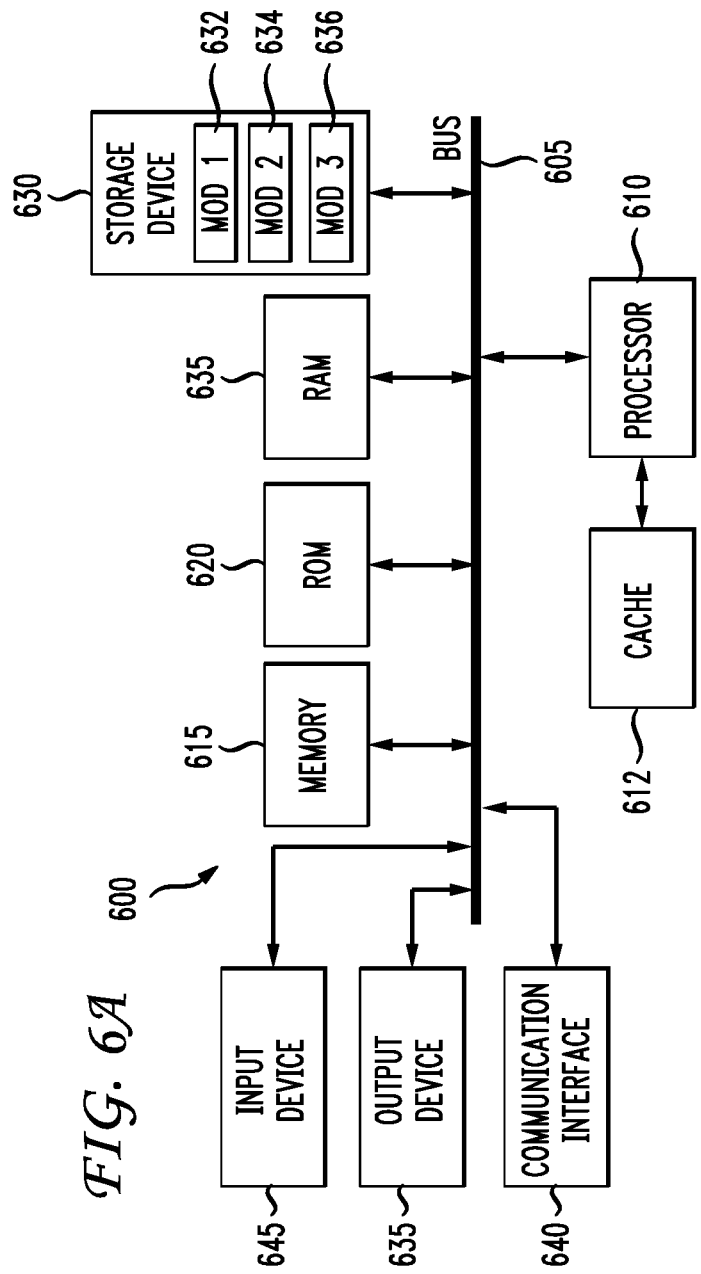
FIG. 6A and FIG. 6B illustrate example system embodiments.
Figure 6B:
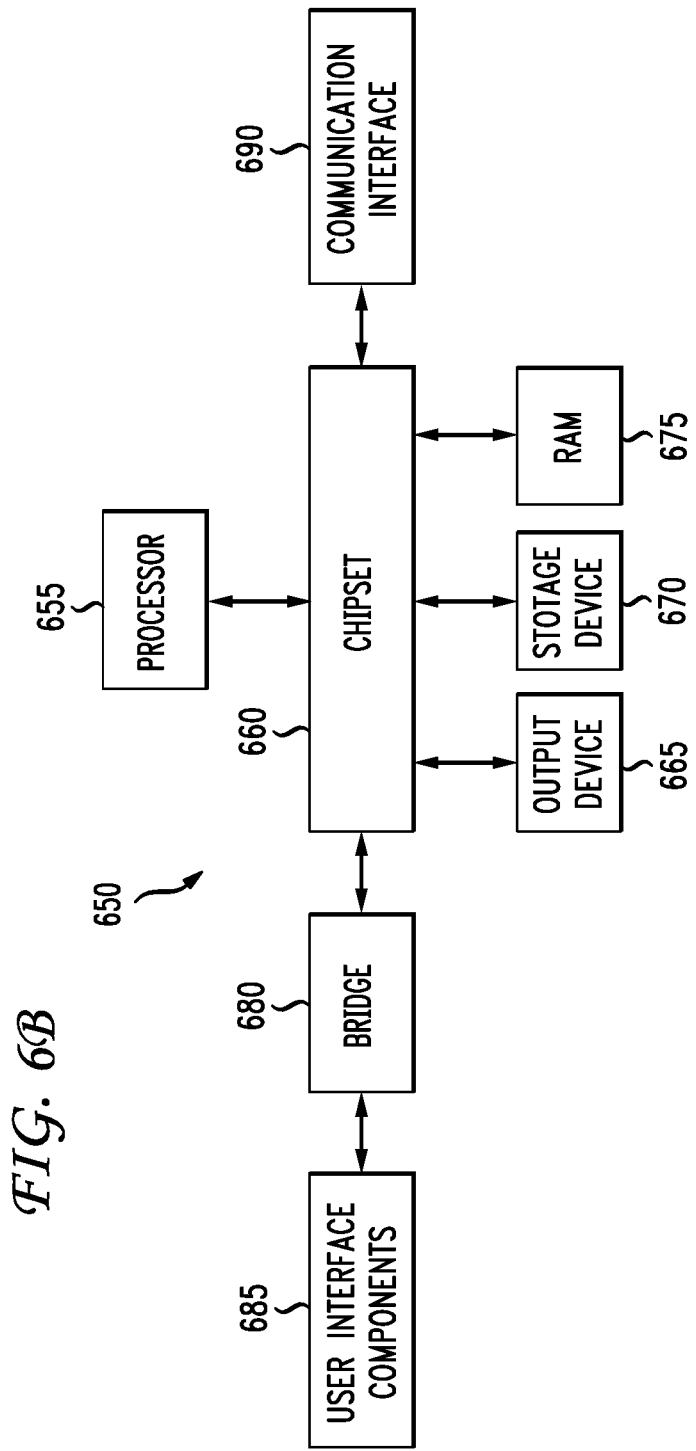

A description of network environments and systems for detecting a rogue device on the network and identifying which wired port is connected to the rogue device, as illustrated in FIGS. 1A and 1B, is first disclosed herein. A discussion of automatic port verification and policy application for rogue device, as illustrated in FIGS. 2-4, will then follow. The discussion then concludes with a brief description of example devices, as illustrated in FIGS. 5 and 6A-B. These variations shall be described herein as the various embodiments are set forth. The disclosure now turns to FIG. 1A.

FIG. 1A illustrates a schematic block diagram of an example rogue device 152 connected to an example network 100. The network 100 can include a controller 102 for monitoring, managing, troubleshooting, and/or administering the network 100. The controller 102 can administer network and security policies, manage network devices (e.g., devices 106-150), manage network segments, administer network settings, etc. Moreover, in some examples, the network 100 can also include one or more additional controllers. For example, the network 100 can include a wireless controller 104 for managing any wireless networks and devices within the network 100. Thus, in some cases, the controller 102 can be a switch controller configured to manage the switches 106-112 in the network 100, and the controller 104 can be a wireless controller configured to manage wireless networks and devices on the network 100.

The network 100 can include a private network, such as a local area network (LAN); a public network, such as a wide area network (WAN); a cloud network, such as a private and/or public cloud; a datacenter network; and/or a combination thereof. Further, the network 100 can include a network device 106 (e.g., switch or router), for interconnecting networks, segments (physical and/or logical), domains, devices, etc., within the network 100. For example, the network device 106 can interconnect the controllers 102, 104 and switches 108-112.

The switches 108-112 can connect endpoints 114-152 to the network 100. The endpoints 114-152 can include client devices, such as smartphones, laptops, desktops, network printers, smart televisions, network cash registers, access points, etc.; servers, such as web servers, file servers, database servers, authentication servers (e.g., Radius servers, directory services servers or domain controllers, etc.); network devices, such as switches, hubs, access points, routers, etc.; virtual machines (VMs); software containers; application endpoint groups; and/or any other network devices.

The switches 108-112 can be part of a same network or network segment, such as a local area network (LAN), or may be part of different networks, sub-networks or network segments, such as LANs, virtual LANs (VLANs), subnets, etc. For example, switches 108-112 can each form a respective LAN and/or VLAN in the network 100. In some cases, the switches 108-112 can serve as ingress/egress points in respective sub-networks or segments, such as LANs or VLANs. Thus, the switches 108-112 can interconnect various LANs within network 100. For example, switch 108 can reside in an office in New York City, switch 110 can reside in an office in Miami, and switch 112 can reside in an office in San Francisco. Here, the switches 108-112 can then interconnect the New York City, Miami, and San Francisco offices.

As previously explained, the switches 108-112 can be part of respective LANs and/or VLANs, which can create logical and/or physical (e.g., geographic) divisions in the network 100. The endpoints 114-152 connected to the switches 108-112 can be part of the different networks, sub-networks, and/or segments (e.g., LANs, VLANs, etc.) associated with the switches 108-112. For example, endpoints 114-120 can reside in LAN A associated with switch 108, endpoints 122-134 can reside in a LAN B associated with switch 110, and endpoints 136-152 can reside in LAN C associated with switch 112. The traffic within the various segments (e.g., LANs A-C) can be logically and/or physically divided. However, as previously noted, the switches 108-112 can also interconnect the example, respective segments (e.g., LANs A-C) via network device 106, for example. The switches 108-112 can also interconnect the endpoints 114-152 with the controllers 102, 104 through the network device 106.

In some cases, the controllers 102, 104 can reside on a separate network, segment, and/or sub-network as the switches 108-112 and endpoints 114-150. For example, the controllers 102, 104 can reside on a private, public, or hybrid cloud. The network device 106 can then connect the switches 108-112 and endpoints 114-152 to the cloud and controllers 102, 104.

The endpoints 114-152 can include wired and wireless endpoints. For example, endpoints 114-122, 128-136, 144-150 can be wired endpoints having a wired connection to a respective port on the switches 108-112. On the other hand, endpoints 124-126, 138-142, 154 can be wireless endpoints which are wirelessly connected to the switches 108-112 via wireless devices 122, 136, 152, which can function as wireless routers or access points. The wireless devices 122, 136, 152 can form wireless networks connected to the network 100, which can connect the wireless endpoints 124-126, 138-142, 154 to the switches 108-112 and the network 100.

To gain access to the network 100, a user can connect a rogue device 152 to a switch (e.g., 108-112 or 128) on the network 100. For example, a user can connect rogue device 152 to a port on switch 112, to try to gain access to the network 100. In some examples, the rogue device 152 can be a wireless router or AP, which can create a wireless network within network 100 and extend network connectivity to nearby wireless devices, such as smartphones, laptops, tablets, etc.

The rogue device 152 may use its connection to switch 112 to try to obtain packets/frames transmitted on the network 100, access resources on the network 100, communicate with other devices on the network 100, steal information stored and/or communicated on the network 100, execute commands on the network, vandalize network data and/or resources, perform attacks on the network, etc. For example, the rogue device 152 may connect to switch 112 to capture frames or packets to and/or from the other endpoints 136-150 coupled with the switch 112.

This can generate significant security risks for the network 100. For example, assume switch 112 is located in a local retail store which includes various endpoints 136-150. The switch 112 interconnects the endpoints 136-150 at the local retail store with other parts of the network 100, such as switches 108-110 which may provide network connectivity to other retail stores or offices, for example. Assume that endpoints 144-146 are cash registers connected to the wired network through switch 112. By connecting the rogue device 152 to the switch 112, a user may be able to capture information processed by the cash registers (i.e., endpoints 144-146 in this example), such as credit card numbers or other sensitive information. Moreover, in many cases, it can be difficult to identify which switch port on the network (i.e., which port on switch 112) the rogue device 152 may have connected to—particularly in larger, more complex networks. However, the longer the rogue device 152 maintains access to the wired network through switch 112, the greater the potential for damage and/or loss resulting from the unauthorized user access to the network 100 through the rogue device 152.

Further, as previously explained, the rogue device 152 can have wireless capabilities which enable a user to wirelessly transmit through the rogue device 152 data obtained from the switch 112, in order to expand the reach or access to the data and resources on the network 100, and increase the number and type of devices that may connect to the wired network through the rogue device 152. For example, the rogue device 152 can be an access point which can allow a wireless device 154 to wirelessly connect to the switch 112 and network 100 through the access point on the rogue device 152. A user can then access the wired network and sniff or capture data transmitted by the access point from any location within wireless reach to the rogue device 152. This can further increase the difficulty in detecting a malicious user on the network 100.

For example, a user with physical access to the switch 112 can connect an access point (e.g., rogue device 152) to a port on the switch 112. To reduce suspicion and likelihood of detection, the user can then physically leave the area (e.g., retail store) and go to a nearby park or lot, where the user can wirelessly connect to the wired network (e.g., switch 112, network 100, etc.) from the user's wireless device 154, through the access point 152 connected to the switch 112. The user can also connect other wireless devices (not shown) to the access point 152 as desired by the user. This can make it significantly harder for a network administrator to detect the user.

To reduce, limit, or prevent this type of unauthorized access, an administrator may want to detect when a rogue device 152 has connected to the network 100, and where specifically the rogue device 152 has connected to the network 100. This way, the administrator can block access by the unauthorized user to the network 100. The administrator can block access to the network 100 by blocking or preventing access or communications through the device (i.e., switch 112) connected to the rogue device 152 and providing the rogue device 152 access to the network 100. For example, the administrator can disable the switch 112 or block traffic to/from the switch 112, which the rogue device 152 has used to access the network 100, to prevent or limit access by the rogue device 152 to the network 100.

However, if the administrator indiscriminately blocks or prevents access through all the ports on the switch 112, the administrator may in turn cause a significant—and possibly unacceptable—network disruption, as some of the ports on the switch 112 may be used by certain users and/or devices to gain connectivity to the network 100. In fact, some of the ports on the switch 112 may be used to interconnect critical devices, such as servers, to the network 100. For example, endpoint 150 can be a web server on the network 100 that is connected to the network 100 through a port on the switch 112. If the network administrator blocks all ports on the switch 112, the administrator would at the same time prevent network access and connectivity to the web server. This can result in a disruption not only to users and devices within the network 100 or segment associated with the switch 112, but also other users and devices around the network 100.

Accordingly, it can be advantageous to identify which specific port on the switch 112 the rogue device 152 has plugged into for access to the network 100, in order to block or prevent further access by the rogue devices 152, 154, as well as any other wireless devices capable of connecting to the rogue device 152. For example, if the administrator can detect the specific port which the rogue device 152 has connected to on the switch 112, the administrator may be able to disconnect that particular port and/or apply a particular security policy to that port to prevent or limit access by the rogue devices 152, 154 to the network 100, without also affecting the other ports on the switch 112—and consequently any of devices connected to the network 100 and switch 112 through those ports.

Referring to FIG. 1B, the switch 112 can include ports 164-178 for establishing wired connections with network devices, such as endpoints 136, 144-152. The switch 112 can send a signal 158 to the controller 102 when it detects that rogue device 152 has connected to a port on the switch 112. The signal 158 can inform the controller 102 that a rogue device 152 has established a wired connection to the switch 112.

The switch 112 can detect the rogue device 152 has plugged into the switch 112 in various ways. For example, the switch 112 can detect the connection of the rogue device 152 by media access control (MAC) matching, client association, network address verification, and/or various other means. In some cases, a wireless device 156 can be used to assist in the detection and/or verification of the rogue device 152. For example, the wireless device 156 can detect wireless or over-the-air signals transmitted by the rogue device 152, and determine that such signals were generated by a rogue device (e.g., an unidentified, unauthenticated, unknown, unauthorized, malicious, unsecured, and/or unaffiliated device). Based on this information, an inference can be made that the device transmitting the wireless signals (i.e., device 152) is a rogue device.

In other cases, the wireless device 156 may be able to connect to the rogue device 152 transmitting the wireless signals and monitor and analyze the rogue device 152 and traffic associated with the rogue device 152 to determine that the device is a rogue device. For example, the wireless device 156 can connect to the rogue device 152 and extract information from the rogue device 152, such as its network address (e.g., IP address), its MAC address, the device name, its serial number, its model, its settings, its behavior, etc.

The rogue device 152 can also be detected based on packets between the rogue device 152 and wireless device 154 and/or 156. For example, the unencrypted portions of packets can be used to correlate the wireless address and wired address of the rogue device 152 and trace the route from the network device 106 or switch 112 to the rogue device 152.

In some cases, the rogue device 152 can be detected in an IEEE 802.1X over IEEE 802.11 security system. For example, in this scenario, the client 156 and access point 152 can get placed into an authentication server's database. When the client 156 authenticates, a session key can get delivered to the client 156 and the access point 152 separately. If the client 156 detects that it cannot use the session key after it has authenticated with the authentication server, the client 156 can determine that the access point 152 is possibly a rogue access point. The client 156 can then authenticate to the authentication server though a different access point. When the client 156 successfully authenticates to the authentication server with the new access point, it can then report the rogue access point 152 to the new access point. The new access point can then report the rogue access point to the controller 102.

Other mechanisms for detecting a rogue device are explained in U.S. patent application Ser. No. 14/882,700, entitled "ACCURATE DETECTION OF ROGUE WIRELESS ACCESS POINTS", filed on Oct. 14, 2015; U.S. Pat. No. 7,370,362, entitled "METHOD AND APPARATUS FOR LOCATING ROGUE ACCESS POINT SWITCH PORTS IN A WIRELESS NETWORK", filed on Mar. 3, 2005; and U.S. Pat. No. 7,181,530, entitled "ROGUE AP DETECTION", filed on Jul. 27, 2001; all of which are incorporated herein by reference in their entirety.

Once the controller 102 determines, based on the signal 158, that a rogue device 152 has connected to a wired port on the switch 112, it can select one or more of the ports 164-178 on the switch 112 to test. For example, the controller 102 can select a subset of the ports 164-178, such as ports 174-178, for testing to determine if the rogue device 152 is connected to any of those selected ports. The controller 102 can select the ports to test in various ways. For example, the controller 102 can select a single port at a time, or a set of ports at a time. When selecting a set of ports, the controller 102 can select any number of ports. For example, the controller 102 can select a portion or percentage of ports on the switch 112, such as half or a quarter of the ports. The controller 102 can also select only a set of ports that are plugged into a device. For example, the controller 102 can select those ports on the switch 112 that are plugged into a device or a subset of those ports that are plugged in, such as a half of those ports. Any other groupings or schemes for selecting a set or subset of ports to test are also contemplated herein.

Once the controller 102 has determined that a rogue device 152 has connected to the switch 112 and selected ports (e.g., ports 174-178) on the switch 112 to test, the controller 102 can send a signal 160 to the selected ports 174-178. The signal 160 can produce a traffic pattern to be transmitted over the selected ports 174-178 to any devices connected to those ports (i.e., devices 148-152). For example, if the rogue device 152 is connected to port 178 on the switch 112, then the signal 160 from the controller 102 to port 178 can cause port 178 to send a specific, predetermined traffic pattern to the rogue device 152. The rogue device 152 can then receive the traffic pattern and output or broadcast one or more signals consistent with the traffic pattern. In other words, the controller 102 can modify the pattern of the traffic broadcast or transmitted by the rogue device 152 based on the signal 160 transmitted to the port 178 connected to the rogue device 152.

The wireless device 156 can wirelessly detect the traffic outputted or broadcast by the rogue device 152 in response to the signal, to determine if the wireless traffic is consistent with (e.g., matches, has a threshold similarity, etc.) the traffic pattern associated with signal 160. The wireless device 156 can then send a signal 162 to the controller 102, which the controller 102 can use to determine if the wireless traffic outputted or broadcast by the rogue device 152 is consistent with the traffic pattern associated with the signal 160. The wireless device 156 can send the signal 162 to the controller 102 via access point 164 or otherwise by connecting to any of the switches 108-112. Moreover, the signal 162 can include an indication that the wireless traffic transmitted by the rogue device 152 is consistent with the traffic pattern, and/or a forwarded copy of the wireless traffic transmitted by the rogue device 152.

If the wireless traffic transmitted by the rogue device 152 is not consistent with the traffic pattern (e.g., does not match, is distinct from, and/or has below a threshold similarity), then the controller 102 can infer that the rogue device 152 is not connected to one of the selected ports 174-178 that received the signal 160 from the controller 102. The controller 102 can then select a different set of ports from the remaining ports 164-172 on the switch 112 which have not been tested.

On the other hand, if the wireless traffic transmitted by the rogue device 152 is consistent with the traffic pattern, then the controller 102 can infer that the rogue device 152 is connected to one of the selected ports 174-178 that received the signal 160 from the controller 102. If the number of selected ports 174-178 is greater than 1, then the controller 102 can repeat the process with a subset of the ports 174-178 until the controller 102 has identified the specific port connected to the rogue device 152.

For example, the controller 102 can continue to send predetermined traffic patterns to a selected subset of the ports 174-178, and repeat the process of determining if the traffic outputted or broadcast by the rogue device 152 is consistent with the traffic pattern(s) transmitted to the selected subset of the ports 174-178, until the controller 102 is able to identify the specific port connected to the rogue device 152.

The number of ports selected to test by the controller 102 in any test or iteration can vary in different cases. For example, the controller 102 can select individual ports and test each port individually, or select a group of two or more ports to test multiple ports in parallel and/or within a time window. Moreover, if multiple iterations of the testing process are necessary to single out the specific port connected to the rogue device 152 (e.g., because the controller 102 tests multiple ports at a time and/or because one or more of the tests do not yield a match between the traffic pattern sent to the switch 112 and the traffic pattern outputted or broadcast by the rogue device 102), the number of ports tested at each test or iteration can remain constant or change. For example, the controller 102 may select four ports in one iteration, three ports in another iteration, and one port in another iteration. As another example, the controller 102 may perform all iterations based on the same, predetermined number of ports (e.g., 1, 2, 3, 4, N).

The number of ports tested in any particular iteration can depend on one or more factors, such as efficiency, size of network, number of ports in a suspected switch, degree of certainty desired, etc. For example, in a switch with 48 ports, the controller 102 may divide the 48 ports into two groups of 24. The controller 102 may then test the first group of 24 and only test the second group of 24 if the first test does not yield a match (i.e., if the controller 102 determines that the rogue device 152 is not connected to any of the first 24 ports tested). This grouping and testing of ports may allow the controller 102 to reduce the amount of time required to single out the specific port, compared to say testing each of the 48 ports separately and individually.

In some cases, when testing multiple ports in parallel, the controller 102 can also vary the traffic sent to the different ports. For example, the controller 102 can provide to the ports 174-178 different, respective traffic patterns to communicate to their respective, connected devices. Thus, the traffic pattern received by endpoint 148 connected to port 174 will be different than the traffic pattern received by endpoints 150 and 152 respectively connected to ports 176-178. As a result, the traffic pattern outputted or broadcast by an access point in one of the ports 174-178 will be different from the traffic pattern outputted or broadcast by another access point in another one of the ports 174-178. This way, the wireless device 156 can detect the traffic pattern outputted or broadcast by the rogue device 152, and inform the controller 102 which can then compare the traffic pattern reported by the wireless device 156 as being associated with the rogue device 152 with the different traffic patterns sent by the controller 102 to the ports 174-178, to determine which specific port is connected to the rogue device 152.

Once the controller 102 detects or suspects a port that may be connected to the rogue device 102, in some cases, it can perform further verification tests until a degree of certainty is reached. Moreover, if the controller 102 determines, after a first test of the selected ports 174-178, that the rogue device 152 may not be connected to any of the selected ports 174-178, the controller 102 can add more ports for testing or select a different set of one or more of the ports 164-178 to test. The controller 102 can modify the number and identity of ports tested as necessary or desired until the controller 102 is able to identify the specific port to which the rogue device 152 is connected to.

The controller 102 can vary traffic patterns in various ways. For example, the controller 102 can limit traffic from the switch port 178 to the rogue device 152 in a predetermined window of time, such as a 1 second window, to a particular portion in the predetermined window of time, such as the first 0.5 seconds of that window, to produce a particular duty cycle, such as a 50% duty cycle. The wireless device 156 can then identify this pattern of traffic over the air to detect that the rogue device 152 is connected to the wired port associated with that particular traffic pattern. If a higher degree of confidence is desired, the controller 102 can repeat with different duty cycles and/or time intervals across the port(s) under test (e.g., ports 174-178) to further test and verify the results.

In some cases, multiple ports can be tested in parallel by varying the duty cycles and/or time intervals on the different ports at the same time. Moreover, the number of ports tested can be modified and varied to provide further testing and/or verification.

The controller 102 can vary the traffic and/or patterns in other ways. For example, the controller 102 can vary the duty cycle, the time intervals, the type of packets/traffic, the sequence of traffic, the behavior or characteristics of the traffic (e.g., bursting behavior, protocols, data size, etc.), and so forth. For example, the controller 102 can send a burst for a specific interval, hold off any communications or cut power for another interval, and repeat, to yield a specific traffic pattern that may be distinguishable.

Once the controller 102 has identified the wired port connected to the rogue device 152, it can perform corrective actions in one or more ways, such as implementing specific security policies on the identified port. Various policies for securing the network and/or preventing a further breach by the rogue device 152 can include limiting throughput through the wired port, moving traffic on that wired port to an isolated VLAN or network segment, adding firewall or security rules, cutting power over Ethernet to the port, disabling the port, etc. The controller 102 can also remove or adjust any policies applied to the wired port once the controller 102 detects that the rogue device 152 is no longer connected and/or the threat is otherwise reduced. Further examples of policies and policy management strategies are further described below.

FIG. 2 illustrates a diagram of an example process 200 for automatic port identification. When the controller 102 determines that a rogue device 152 has connected to the switch 112 on the network, it can send (202) a specific traffic pattern to one or more ports (e.g., ports 1-N) on the switch 112 connected to the rogue device 152. The traffic pattern can include one or more signals, packets, commands, and/or instructions that can cause the one or more ports to communicate the specific traffic pattern to any devices connected to the switch 112 through the one or more ports.

The traffic pattern can be different for different ports. For example, if the controller 102 sends the traffic pattern to multiple ports at the same time to test those ports in parallel, the controller 102 can vary the traffic pattern to different ports to make the patterns associated with the different ports distinguishable over each other. However, in some cases, the controller 102 can send the same pattern to multiple ports either at the same time interval or one or more different time intervals.

The switch 112 can receive the traffic pattern and subsequently transmit (204) the traffic pattern through the one or more ports to any devices connected to the switch 112 through those ports. Assuming that the rogue device 152 is connected to one of the one or more ports that received the traffic pattern from the controller 102, the rogue device 152 would receive the traffic pattern transmitted to the wired port connected to the rogue device 152. In turn, the rogue device 152 can transmit (206) the traffic pattern wirelessly, over the air.

The wireless device 156 can detect the traffic pattern transmitted by the rogue device 152 over the air, and send a message (208) to the controller 102, indicating that the wireless device 156 has detected the traffic pattern. If the traffic pattern sent by the controller 102 to the switch 112 was only sent to one of the ports on the switch 112, then the controller 112 can determine the specific wired port connected to the rogue device 152 from the message (208) received from the wireless device 156 indicating that the traffic pattern was detected.

On the other hand, if the controller 102 selected multiple ports to test, then the controller 102 may need to do further testing after receiving the message (208) from the wireless device 156 to further narrow down which specific port from the multiple ports is the port connected to the rogue device 152. Accordingly, the controller 102 can send (210) another traffic pattern to one or more ports on the switch 112. The traffic pattern can be the same traffic pattern previously sent or a different, modified traffic pattern. Moreover, in some cases, the ports selected here can be a subset of the ports previously tested. For example, if the traffic pattern from the previous test was transmitted to four of the ports on the switch 112, then after receiving an indication that the wired port connected to the rogue device 152 is one of the four tested ports, the controller 102 can select one, two, or three of the four ports for further testing. The controller 102 can then send (210) the traffic pattern for this test to the one, two, or three ports selected from the four ports previously tested.

The switch 112 can then receive the traffic pattern through the one or more ports selected by the controller 102 for this test, and send (212) the traffic pattern from those selected one or more ports to the rogue device 152. If the rogue device 152 is connected to the switch 112 on one of the tested ports, then the rogue device 152 can subsequently transmit (214) the traffic pattern to the wireless device 156. Alternatively, if the rogue device 152 is not connected to switch 112 through one of the one or more ports selected for this test, then the rogue device 152 may not receive the traffic pattern. In this case, the wireless device 156 may not detect the traffic pattern over the air and may report so to the controller 102, which can then infer that the rogue device 152 is not connected to any of the one or more ports tested in this round. Based on these results as well as the results from the previous test, the controller 102 may be able to further narrow the number of potential ports that may include the port connected to the rogue device 152 or even identify which specific port is connected to the rogue device 152. The controller 102 can continue testing ports and narrowing the number of possibilities as necessary until the specific port is identified.

As previously noted, if the rogue device 152 is connected to the switch 112 on one of the ports tested in this round, it can then receive the traffic pattern from the controller 102 and transmit (214) the traffic pattern over the air. The wireless device 156 can then detect the traffic pattern over the air, and send a message (216) to the controller 102, indicating that the wireless device 156 has detected the traffic pattern.

Based on the message from the wireless device 156, the controller 102 may be able to identify the specific port on the switch 112 that is connected to the rogue device 152. If, however, the controller 102 still has multiple ports as potential candidates, it can repeat the testing process as before to narrow the number of candidate ports until the specific port connected to the rogue device 152 is identified.

Once the controller 102 has identified the port connected to the rogue device 152, the controller 102 can send (218) a verification pattern to the identified port on the switch 112. The verification pattern can be a traffic pattern for verifying the determination that the identified port is the specific port connected to the rogue device 152. The verification pattern can be the same as any of the previous traffic patterns or it can differ. For example, the controller 102 can vary the pattern of the traffic in the verification test to increase the confidence levels.

The switch 112 can receive the verification pattern through the identified port. The identified port can then send (220) the verification pattern to the rogue device 152 for transmission or broadcast by the rogue device 152 over the air. The rogue device 152 can then transmit (222) the verification pattern over the air.

The wireless device 156 can then detect the verification pattern over the air, and send (224) a message to the controller 102 indicating that the wireless device 156 has detected the verification pattern. The controller 156 can then analyze the message and verify that the identified port is indeed the wired port connected to the rogue device 152. If a higher confidence level is desired, the controller 102 can again perform another verification test, which can be based on the same verification pattern or a different verification pattern. In some cases, the controller 102 can continue to perform verification tests until a threshold confidence is reached. Thus, the controller 102 can increase the confidence of its determination by increasing the number of positive tests it obtains.

In some cases, the controller 102 can also increase the confidence of its determination by modifying in specific ways the traffic pattern(s) used to test and/or verify that a port is the correct port connected to the rogue device 152. For example, the controller 102 can increase the complexity and/or irregularity of the pattern to increase the confidence that a match is an accurate predictor. To illustrate, the controller 102 can modify the pattern to create a pattern with very unique and specific duty cycles and/or characteristics, and over a longer window of time, to increase the likelihood that a match may yield increasingly reliable results. This strategy of modifying the characteristics or pattern of the traffic for increased confidence can be used as a strategy for obtaining higher confidence levels either in lieu of performing an increased number of tests or verifications or in addition to performing the increased number of tests or verifications.

Figure 3A:
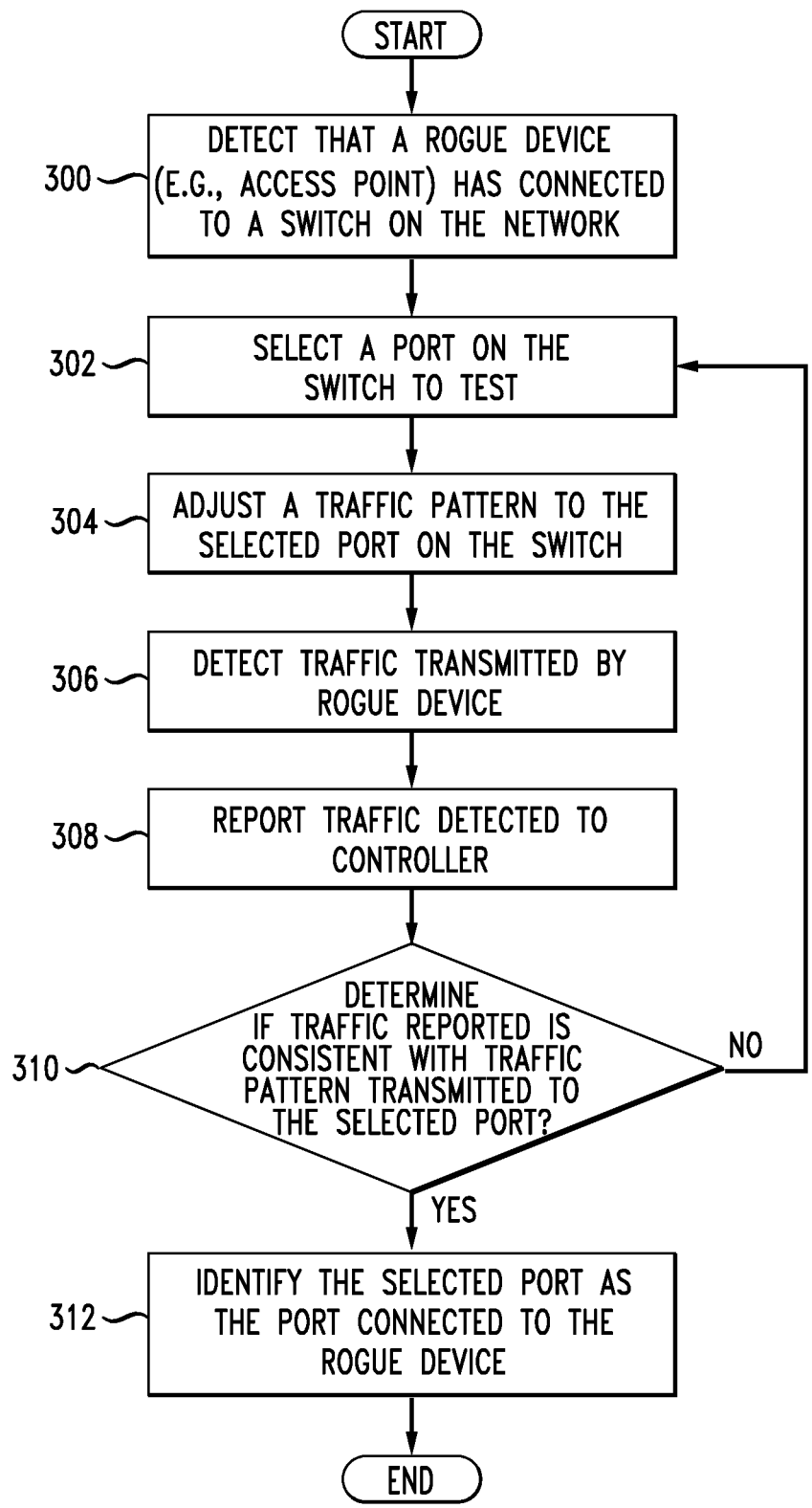
FIG. 3A illustrates a first example method for automatic port identification.
Figure 3B:
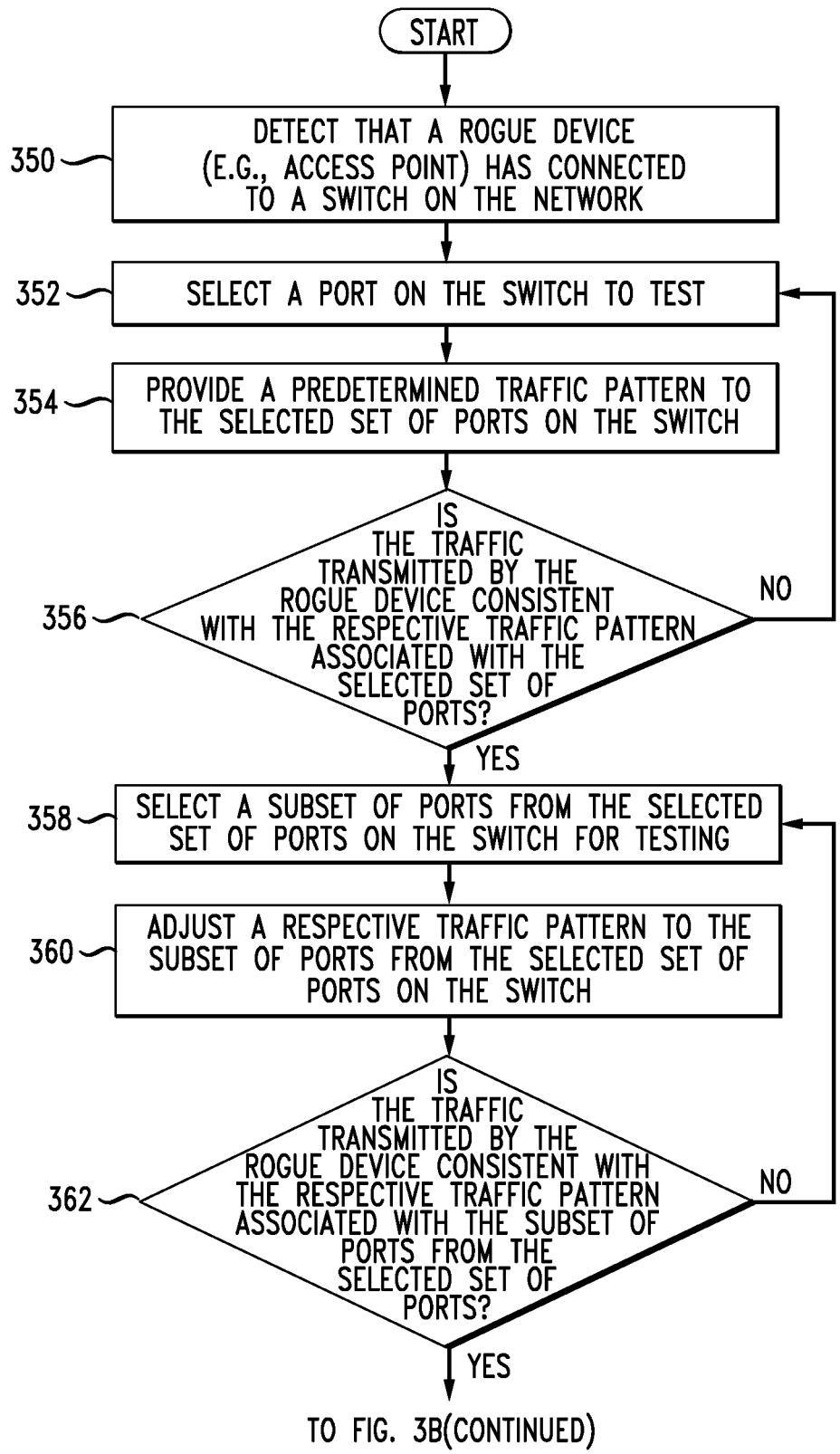
FIG. 3B illustrates a second example method for automatic port identification.
Figure 3B:
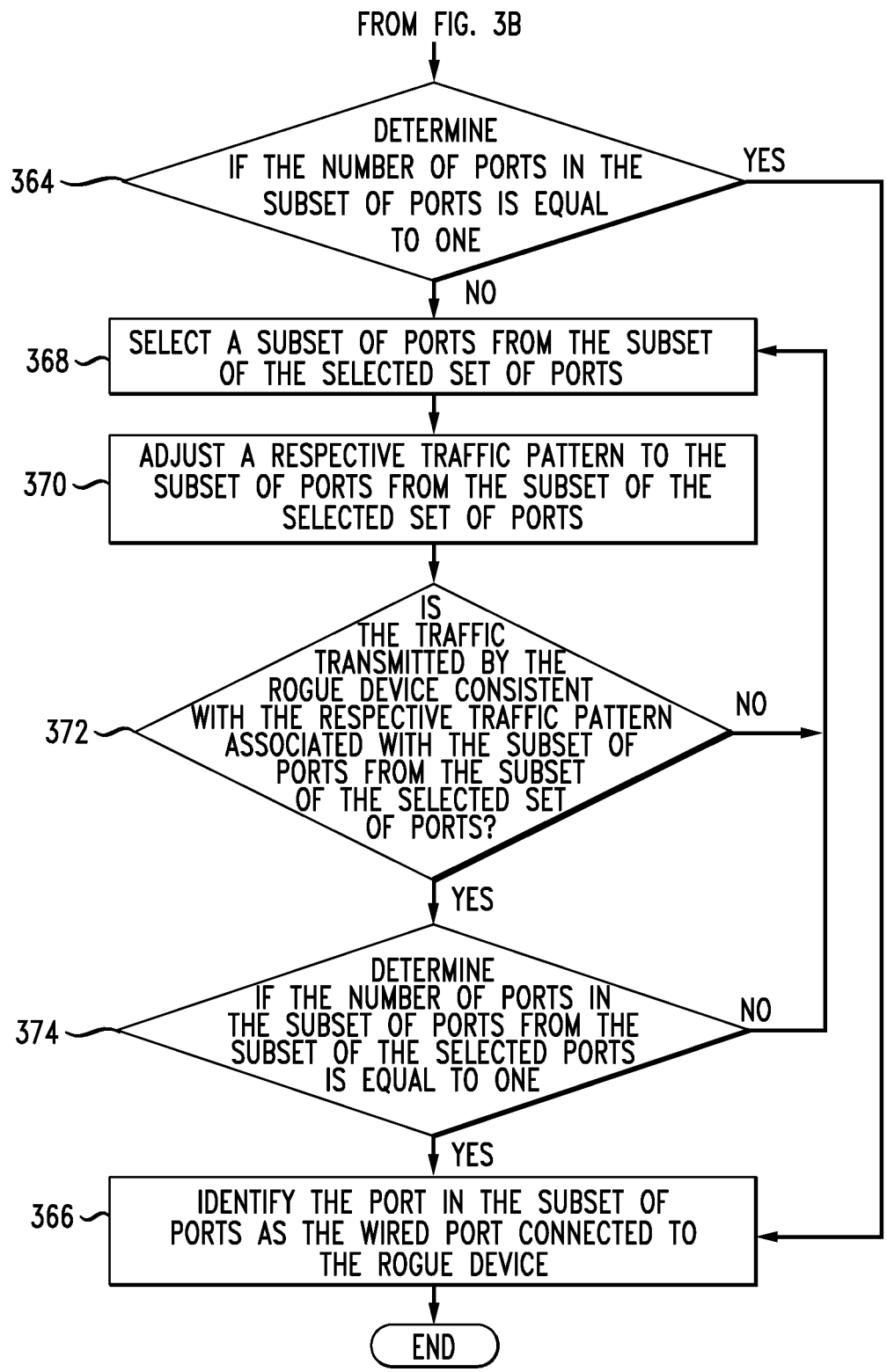
Figure 4:
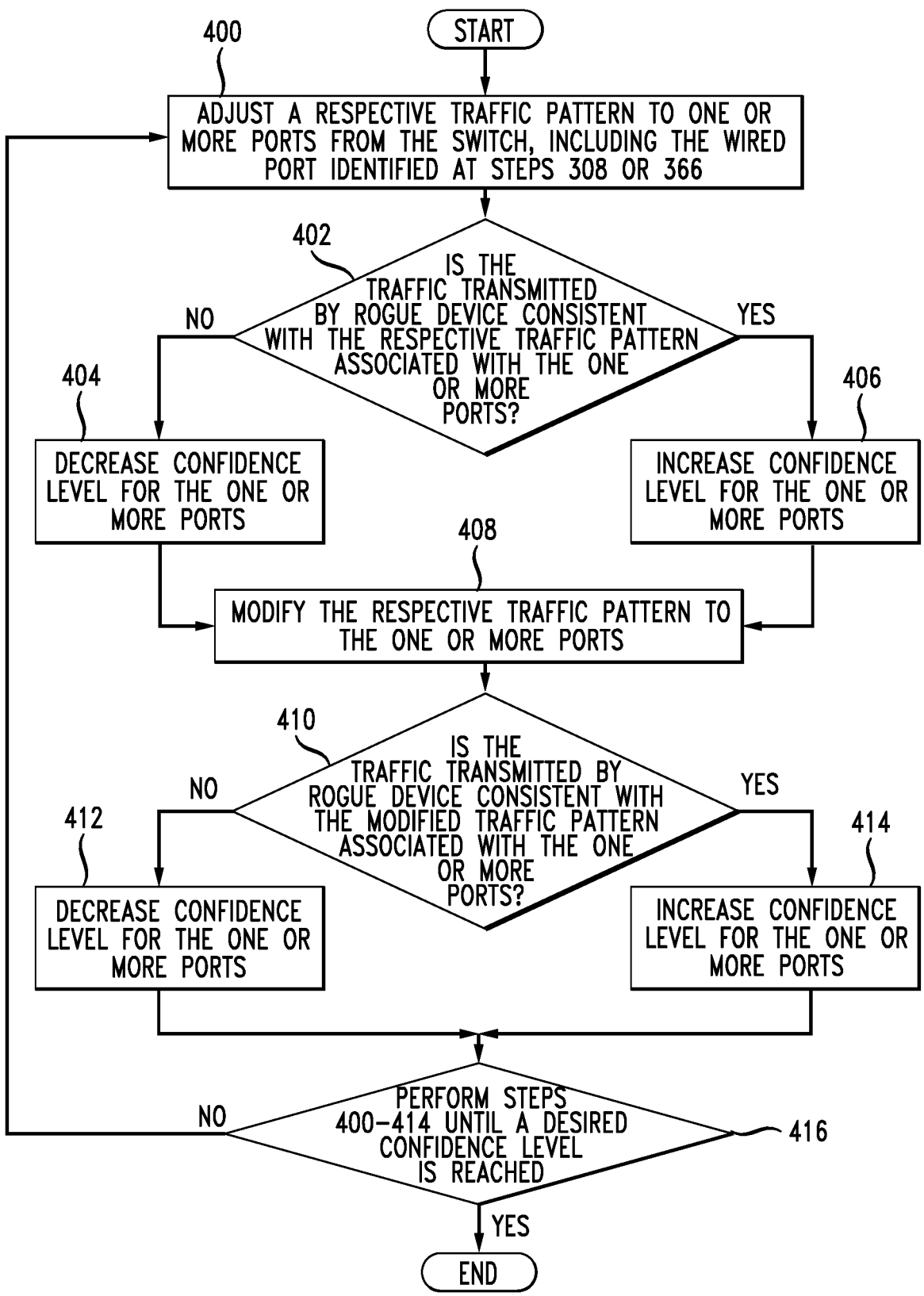
FIG. 4 illustrates an example method for port verification.

Having disclosed some basic system components and concepts, the disclosure now turns to the example method embodiments shown in FIGS. 3A, 3B, and 4. For the sake of clarity, the methods are described in terms of the network 100 shown in FIGS. 1A and 1B. The steps outlined herein are exemplary and can be implemented in any combination thereof, including combinations that exclude, add, or modify certain steps.

FIG. 3A illustrates a flowchart of an example method for automatic port identification. At step 300, the controller 102 can determine that a rogue device 152 (e.g., Access Point) has connected to a switch 112 on the network 100. For example, the switch 112 can detect when a new device connects to the switch 112. The switch 112 and/or the controller 102 can then determine, as previously explained, if the new device is a rogue device.

At step 302, the controller 102 can select a port on the switch 112 to test, in order to determine if the rogue device 152 is connected to the selected port on the switch 112. To test the selected port, at step 304, the controller 102 can adjust a traffic pattern to the selected port on the switch 112. For example, the controller 102 can send one or more commands, instructions, signals, and/or packets to the selected port configured to cause the selected port to transmit a particular traffic pattern to any devices plugged into the selected port. The traffic pattern can vary in various ways. For example, the traffic pattern can be designed to limit the traffic processed by the selected port during a particular portion of predetermined window of time.

To illustrate, the traffic pattern can be configured to limit traffic during the first or last 0.5 seconds of a 1 second window. This example can produce a 50% duty cycle. Other examples can vary the duty cycle and/or time interval, and/or any other factor of the traffic, such as the amount of packets/frames, the type of packets/frames, the particular protocol and/or ports associated with the traffic, the sequence of packets in the traffic, the contents of the traffic (e.g., one or more packets containing a flag or bit that may distinguish the packets from other packets, adjusting the header(s) in one or more packets to make such packets identifiable, etc.), the time intervals of transmission or bursting, etc.

At step 306, the wireless device 156 can detect over-the-air traffic transmitted by the rogue device 152 connected to the switch 112. At step 308, the wireless device 156 can report the over-the-air traffic detected by the wireless device 156 to the controller 102. At step 310, the controller 102 can determine if the traffic reported by the wireless device 156 is consistent with the traffic pattern transmitted to the selected port. In other words, the controller 102 can compare the pattern of the traffic detected and reported by the wireless device 156 with the pattern of the traffic transmitted to the selected port to be broadcast by the device connected to the selected port.

This comparison or determination can help the controller 102 determine if the rogue device 152 is connected to the selected port. For example, if the controller 102 determines that the over-the-air traffic transmitted by the rogue device 152 is consistent with, or has a threshold similarity to, the pattern of traffic sent to the selected port on the switch 112, then the controller 102 can infer that the rogue device 152 is likely connected to the selected port tested.

If the controller 102 determines that the traffic reported by the wireless device 156 is not consistent with the traffic pattern sent to the selected port, then the method can return to step 302, where the controller 102 can select a different port on the switch 112 to test.

On the other hand, if the controller 102 determines that the traffic reported by the wireless device 156 is consistent (i.e., matches or has a threshold degree of similarity) with the traffic pattern sent to the selected port, then at step 312, the controller 102 can identify the selected port as the port connected to the rogue device 152. In other words, the controller 102 can determine that the rogue device 152 is plugged into the selected port.

After the controller 102 has identified the specific port that the rogue device 152 is plugged into, in some cases, the controller 102 can perform further verification tests as described below with reference to FIG. 4. The verification test(s) can be performed as desired based on the degree of confidence desired. In other words, the controller 102 can perform verification tests until it reaches a desired degree of confidence or certainty in its determination that the identified port is indeed the port connected (e.g., plugged into) the rogue device 152.

Once the controller 102 has identified the port connected to the rogue device 152, it can take corrective or containment steps to secure the network 100 and prevent certain access by the rogue device 152 to data and/or resources in the network 100. In some cases, the controller 102 can protect or secure the network by applying one or more policies to the identified port connected to the rogue device 152.

For example, the controller 102 can send a message to the switch 112 to change the port policy associated with the identified port. The modified policy can provide protect the network 100 and data in various ways. To illustrate, the policy can limit the throughput at the identified port, move traffic associated with the identified port to an isolated network segment such as a VLAN, provide firewall rules and/or access restrictions, reduce or eliminate the power over Ethernet to the identified port, disable the identified port completely, block traffic over the identified port, filter packets to and/or from the rogue device 152 over the identified port, prompt for security and/or authentication, etc. The controller 102 can also take other protective steps, such as generating an alert or notification to a device or user, logging the event (i.e., connection by the rogue device, detection of the rogue device, etc.), monitor the identified port, etc.

Any policy applied to the identified port to protect against the rogue device 152 can remain in place indefinitely or until a particular event is detected. For example, the policy can remain in place until the rogue device 152 is disconnected from the identified port. To illustrate, the controller 102 can monitor the identified port and detect when the rogue device 152 disconnects from the port. Once the rogue device 152 has disconnected from the port, the controller 102 can change or reset the policy applied to that port. For example, the controller 102 can roll-back the rogue policy when the physical port state is changed to prevent the rogue policy from preventing or limiting service to a non-rogue device that connects to that port in the future.

FIG. 3B illustrates a flowchart of another example method for automatic port identification. At step 350, the controller 102 can determine that a rogue device 152 (e.g., Access Point) has connected to a switch 112 on the network 100. At step 352, the controller 102 can select a set of ports on the switch 112 to test, in order to determine if the rogue device 152 is connected to any of the selected ports on the switch 112. The controller 102 can select multiple ports to test in parallel. Moreover, the controller 102 can select less than all of the ports on the switch 112 for testing. This can reduce the number of tests performed and the amount of time until the specific port is identified. For example, the controller 102 can select a portion or percentage of the ports on the switch 112 (e.g., half of the ports on the switch 112), a portion or percentage of the ports on the switch 112 that are currently connected to a device, etc.

To test the selected set of ports, at step 354, the controller 102 can provide a predetermined traffic pattern to the selected set of ports on the switch 112. At step 356, the controller 102 and/or the wireless device 156 can determine if the over-the-air traffic transmitted by the rogue device 152 is consistent with (e.g., has a threshold similarity) the traffic pattern transmitted to the selected set of ports. For example, the wireless device 156 can detect the over-the-air traffic broadcast by rogue device 152 and report the over-the-air traffic detected to the controller 102 and/or send an indication to the controller 102 specifying whether the detected over-the-air traffic is consistent with the traffic pattern transmitted to the selected set of ports. The controller 102 can then determine if the traffic detected by the wireless device 156 matches with the traffic pattern transmitted to the selected set of ports.

If the controller 102 determines that the traffic transmitted by the rogue device 152 is not consistent with (e.g., does not match and/or does not have a threshold similarity) the traffic pattern transmitted to the selected set of ports, the method can return to step 352, and the controller 102 can select a different set of ports on the switch 112 to test. The controller 102 can continue this process until it detects a match between a traffic pattern transmitted to one or more selected ports and the over-the-air traffic transmitted by the rogue device 152.

At step 358, if the controller 102 determines that the traffic transmitted by the rogue device 152 is consistent with the traffic pattern transmitted to the selected set of ports, the controller 102 can select a subset of the selected set of ports to test. For example, if the controller 102 at step 356 determines that the traffic pattern transmitted to ten selected ports on the switch 112 matches the pattern of over-the-air traffic transmitted by the rogue device 152, then at step 358 the controller 102 can select a subset of those ten selected ports to test, such as half of the ten ports. This way, the controller 102 can continue to narrow down the number of candidate ports until it identifies the specific port. The number of the subset of ports selected at step 358 can vary. For example, the subset can be a single port so the controller 102 can continue by testing each individual port in the selected set of ports, or multiple ports so the controller 102 can test multiple ports in parallel.

At step 360, the controller 102 can adjust the respective traffic pattern transmitted to the subset of ports selected at step 358. The respective traffic pattern and/or the associated time interval can vary so that each port receives a different or unique traffic pattern or time interval vis-à-vis the traffic patterns and time intervals received by the other ports in the subset. However, in some cases, the respective traffic pattern can be the same for all of the ports in the subset of ports.

At step 362, the controller 102 can determine if the respective traffic pattern is consistent with over-the-air traffic transmitted by the rogue device 152. For example, the wireless device 156 can detect the over-the-air traffic and provide the controller 102 with the over-the-air traffic detected and/or a notification indicating whether the over-the-air traffic is consistent with the respective traffic pattern.

If the respective traffic pattern is not consistent with (i.e., does not match or have a threshold similarity) the over-the-air traffic, then the method can return to step 358 where the controller 102 can select a different subset of ports to test. Since the traffic transmitted by the rogue device 152 does not match the respective traffic pattern transmitted to the subset of ports, the controller 102 can infer that the rogue device 152 is not connected to any of the subset of ports.

On the other hand, if the respective traffic pattern is consistent with the over-the-air traffic, at step 364, the controller 102 can determine if the number of ports in the selected subset of ports is equal to one. If the subset of ports equals one port, then at step 366 the controller 102 can identify that port as the port connected to the rogue device 152. However, if the subset of ports is greater than one, then the controller 102 may need to further narrow the number of ports to identify the particular port connected to the rogue device 152.

Accordingly, if the number of ports in the subset is greater than one, at step 368, the controller 102 can select another subset of ports from the subset of ports for further testing. At step 370, the controller 102 can adjust the respective traffic pattern transmitted to the subset of ports selected at step 368. At step 372, the controller 102 can determine if the over-the-air traffic transmitted by the rogue device 152 is consistent with the respective traffic pattern transmitted to the subset of ports selected at step 368.

If the over-the-air traffic is not consistent with the respective traffic pattern associated with the subset of ports, then the method can return to step 368 where the controller 102 can select another subset of ports for further testing. On the other hand, if the over-the-air traffic is consistent with the respective traffic pattern associated with the subset of ports, then at step 374 the controller 102 can determine if the subset of ports tested is equal to one. If the subset of ports equals one port, then the method continues to step 366, where the controller 102 can identify the port as the port connected to the rogue device 152. By contrast, if the subset of ports is greater than one, the method can return to step 368, where the controller 102 can select another subset of ports for testing. The controller 102 can continue narrowing down the number of ports tested until the controller 102 obtains a match for a single port tested, indicating that such port is the port connected to the rogue device 152.

Once the controller 102 has identified a port, it can perform one or more verification tests as further described below with reference to FIG. 4. Moreover, when the controller 102 identifies the port connected to the rogue device 152 with a desired level of confidence, the controller 102 can perform security and/or corrective steps, such as applying a rogue or security policy to the identified port, as previously explained.

FIG. 4 illustrates a flowchart of an example method for port verification. The port verification method can be performed by the controller 102 to verify a port identified as the port connected to the rogue device 152, such as the port identified in steps 312 or 366 from FIGS. 3A and 3B. The port verification method can be used to verify the port identified at steps 312 or 366 with a specific degree of confidence. For example, if a high degree of confidence is desired, the verification method can be designed to achieve such desired degree of confidence.

The verification method can start at step 400, where the controller 102 can adjust a traffic pattern to the identified port (e.g., port identified in step 312 or 366) on the switch 112. As previously explained, the traffic pattern can be varied in various ways so it is distinct from other traffic processed by the switch 112 and/or the network 100, to allow the traffic pattern to be identified and distinguished from other traffic and traffic patterns. In some examples, the traffic pattern can be adjusted with varying degrees of intended uniqueness. For example, the characteristics, features, and/or aspects of the traffic that are varied in the traffic pattern used for testing can depend on how unique or distinctive the traffic pattern is intended to be. To illustrate, certain variations made to a traffic pattern can result in greater uniqueness or distinctiveness which can, in some cases, yield a higher confidence in the testing process.

At step 402, the controller 102 can determine if the traffic transmitted by the rogue device 152 is consistent with the traffic pattern provided to the identified port. If the controller 102 determines that the traffic transmitted by the rogue device 152 does not match or has a lower probability of a match to the traffic pattern provided to the identified port, at step 404, the controller 102 can decrease the level of confidence in its previous determination that the identified port is the port connected to the rogue device 152. On the other hand, if the controller 102 determines that the traffic transmitted by the rogue device 152 does match or has a higher probability of a match to the traffic pattern provided to the identified port, at step 406, the controller 102 can increase the level of confidence in its previous determination that the identified port is the port connected to the rogue device 152.

Depending on the degree of confidence desired versus the degree of confidence obtained at this stage, the method can optionally continue to step 408 for further verification. At step 408, the controller 102 can further adjust the traffic pattern provided to the identified port.

At step 410, the controller 102 can determine if the traffic transmitted by the rogue device 152 is consistent with the traffic pattern provided to the identified port. If the controller 102 determines that the traffic transmitted by the rogue device 152 does not match or has a lower probability of a match to the traffic pattern provided to the identified port, at step 412, the controller 102 can decrease the level of confidence from the level of confidence obtained at steps 404 or 406. On the other hand, if the controller 102 determines that the traffic transmitted by the rogue device 152 does match or has a higher probability of a match to the traffic pattern provided to the identified port, at step 414, the controller 102 can increase the level of confidence from the level of confidence obtained at steps 404 or 406.

At step 416, the controller 102 can determine if a desired confidence level has been reached. If the desired confidence level has not been reached, the method can return to step 400 or step 408 for further verification tests. In some cases, depending on the confidence level at step 416, the controller 102 may need to perform the identification method illustrated in FIG. 3A or 3B. For example, if the verification method in steps 400-416 yields a sufficiently low confidence level so as to cast doubt on the port identification performed in step 312 or step 366 or otherwise suggest that the controller 102 has identified the wrong port, then the controller 102 may want to repeat the identification method from FIG. 3A or 3B and/or the verification method in FIG. 4.

At step 418, if the controller 102 determines that the desired confidence level has been reached, the controller 102 can end the verification process and conclude that the identified port is the port connected to the rogue device 152.

The disclosure now turns to FIGS. 5 and 6A-B, which illustrate example devices.

FIG. 5 illustrates an example network device 500 suitable for performing switching, port identification, and/or port verification operations. Network device 500 includes a master central processing unit (CPU) 504, interfaces 502, and a bus 510 (e.g., a PCI bus). When acting under the control of appropriate software or firmware, the CPU 504 is responsible for executing packet management, error detection, and/or routing functions. The CPU 504 preferably accomplishes all these functions under the control of software including an operating system and any appropriate applications software. CPU 504 may include one or more processors 508 such as a processor from the Motorola family of microprocessors or the MIPS family of microprocessors. In an alternative embodiment, processor 508 is specially designed hardware for controlling the operations of network device 500. In a specific embodiment, a memory 506 (such as non-volatile RAM, a TCAM, and/or ROM) also forms part of CPU 504. However, there are many different ways in which memory could be coupled to the system.

The interfaces 502 are typically provided as interface cards (sometimes referred to as "line cards"). Generally, they control the sending and receiving of data packets over the network and sometimes support other peripherals used with the network device 500. Among the interfaces that may be provided are Ethernet interfaces, frame relay interfaces, cable interfaces, DSL interfaces, token ring interfaces, and the like. In addition, various very high-speed interfaces may be provided such as fast token ring interfaces, wireless interfaces, Ethernet interfaces, Gigabit Ethernet interfaces, ATM interfaces, HSSI interfaces, POS interfaces, FDDI interfaces and the like. Generally, these interfaces may include ports appropriate for communication with the appropriate media. In some cases, they may also include an independent processor and, in some instances, volatile RAM. The independent processors may control such communications intensive tasks as packet switching, media control and management. By providing separate processors for the communications intensive tasks, these interfaces allow the master microprocessor 504 to efficiently perform routing computations, network diagnostics, security functions, etc.

Although the system shown in FIG. 5 is one specific network device of the present invention, it is by no means the only network device architecture on which the present invention can be implemented. For example, an architecture having a single processor that handles communications as well as routing computations, etc. is often used. Further, other types of interfaces and media could also be used with the router.

Regardless of the network device's configuration, it may employ one or more memories or memory modules (including memory 506) configured to store program instructions for the general-purpose network operations and mechanisms for roaming, route optimization and routing functions described herein. The program instructions may control the operation of an operating system and/or one or more applications, for example. The memory or memories may also be configured to store tables such as mobility binding, registration, and association tables, etc.

FIG. 6A and FIG. 6B illustrate example system embodiments. The more appropriate embodiment will be apparent to those of ordinary skill in the art when practicing the present technology. Persons of ordinary skill in the art will also readily appreciate that other system embodiments are possible.

FIG. 6A illustrates a system bus computing system architecture 600 wherein the components of the system are in electrical communication with each other using a bus 605. Exemplary system 600 includes a processing unit (CPU or processor) 610 and a system bus 605 that couples various system components including the system memory 615, such as read only memory (ROM) 670 and random access memory (RAM) 675, to the processor 610. The system 600 can include a cache of high-speed memory connected directly with, in close proximity to, or integrated as part of the processor 610. The system 600 can copy data from the memory 615 and/or the storage device 630 to the cache 617 for quick access by the processor 610. In this way, the cache can provide a performance boost that avoids processor 610 delays while waiting for data. These and other modules can control or be configured to control the processor 610 to perform various actions. Other system memory 615 may be available for use as well. The memory 615 can include multiple different types of memory with different performance characteristics. The processor 610 can include any general purpose processor and a hardware module or software module, such as module 1 637, module 2 634, and module 3 636 stored in storage device 630, configured to control the processor 610 as well as a special-purpose processor where software instructions are incorporated into the actual processor design. The processor 610 may essentially be a completely self-contained computing system, containing multiple cores or processors, a bus, memory controller, cache, etc. A multi-core processor may be symmetric or asymmetric.

To enable user interaction with the computing device 600, an input device 645 can represent any number of input mechanisms, such as a microphone for speech, a touch-sensitive screen for gesture or graphical input, keyboard, mouse, motion input, speech and so forth. An output device 635 can also be one or more of a number of output mechanisms known to those of skill in the art. In some instances, multimodal systems can enable a user to provide multiple types of input to communicate with the computing device 600. The communications interface 640 can generally govern and manage the user input and system output. There is no restriction on operating on any particular hardware arrangement and therefore the basic features here may easily be substituted for improved hardware or firmware arrangements as they are developed.

Storage device 630 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 675, read only memory (ROM) 670, and hybrids thereof.

The storage device 630 can include software modules 637, 634, 636 for controlling the processor 610. Other hardware or software modules are contemplated. The storage device 630 can be connected to the system bus 605. In one aspect, a hardware module that performs a particular function can include the software component stored in a computer-readable medium in connection with the necessary hardware components, such as the processor 610, bus 605, display 635, and so forth, to carry out the function.

FIG. 6B illustrates an example computer system 650 having a chipset architecture that can be used in executing the described method and generating and displaying a graphical user interface (GUI). Computer system 650 is an example of computer hardware, software, and firmware that can be used to implement the disclosed technology. System 650 can include a processor 655, representative of any number of physically and/or logically distinct resources capable of executing software, firmware, and hardware configured to perform identified computations. Processor 655 can communicate with a chipset 660 that can control input to and output from processor 655. In this example, chipset 660 outputs information to output 665, such as a display, and can read and write information to storage device 670, which can include magnetic media, and solid state media, for example. Chipset 660 can also read data from and write data to RAM 675. A bridge 680 for interfacing with a variety of user interface components 685 can be provided for interfacing with chipset 660. Such user interface components 685 can include a keyboard, a microphone, touch detection and processing circuitry, a pointing device, such as a mouse, and so on. In general, inputs to system 650 can come from any of a variety of sources, machine generated and/or human generated.

Chipset 660 can also interface with one or more communication interfaces 660 that can have different physical interfaces. Such communication interfaces can include interfaces for wired and wireless local area networks, for broadband wireless networks, as well as personal area networks. Some applications of the methods for generating, displaying, and using the GUI disclosed herein can include receiving ordered datasets over the physical interface or be generated by the machine itself by processor 655 analyzing data stored in storage 670 or 675. Further, the machine can receive inputs from a user via user interface components 685 and execute appropriate functions, such as browsing functions by interpreting these inputs using processor 655.

It can be appreciated that example systems 600 and 650 can have more than one processor 610 or be part of a group or cluster of computing devices networked together to provide greater processing capability.

For clarity of explanation, in some instances the present technology may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

Claim language reciting "at least one of" a set indicates that one member of the set or multiple members of the set satisfy the claim. For example, claim language reciting "at least one of A and B" means A, B, or A and B.

What is claimed is:

1. A method comprising:
  determining an unauthorized wireless device has connected to an unknown port of a plurality of ports on a network device associated with a network;
  determining which of the plurality of ports on the network device is connected to the unauthorized wireless device by:
    determining one or more predetermined traffic patterns to be transmitted by the network device via one or more of the plurality of ports;
    determining one or more traffic patterns transmitted by the unauthorized wireless device, wherein the one or more traffic patterns transmitted by the unauthorized wireless device are determined based at least in part on a previously determined identity information of the unauthorized wireless device;
    determining the one or more traffic patterns transmitted by the unauthorized wireless device has a threshold degree of similarity to a matching traffic pattern from the one or more predetermined traffic patterns, to yield a traffic pattern match, the threshold degree of similarity including matching traffic patterns and similar traffic patterns, the similar traffic patterns including variable degrees of similarity and variable confidence levels based on the variable degrees of similarity; and
    based on the traffic pattern match, determining a port from the plurality of ports is associated with the matching traffic pattern is connected to the unauthorized wireless device, to yield an identified port;
  selecting a port policy for the identified port; and
  applying the port policy to the identified port, wherein the port policy is configured to disconnect the unauthorized wireless device from the network.

2. The method of claim 1, further comprising:
  verifying the identified port is connected to the unauthorized wireless device by:
    implementing a verification policy on the identified port, the verification policy configured to cause a first traffic pattern to be transmitted by any device connected to the identified port;
    detecting a second traffic pattern transmitted by the unauthorized wireless device;
    determining a degree of similarity between the first traffic pattern and the second traffic pattern;
    determining a confidence level based on the degree of similarity; and
    verifying the identified port is connected to the unauthorized wireless device when the confidence level exceeds a threshold.

3. The method of claim 2, wherein implementing the verification policy comprises instructing the identified port to transmit the first traffic pattern to the any device connected to the identified port.

4. The method of claim 2, wherein the first traffic pattern is generated by limiting or stopping traffic transmitted by the identified port to the any device connected to the identified port during a predetermined portion of a time interval.

5. The method of claim 2, wherein the first traffic pattern comprises a duty cycle produced by stopping traffic transmitted via the identified port for a particular sub-interval of time within a predetermined interval of time, wherein the predetermined interval of time comprises a first sub-interval of time, a second sub-interval of time is sequentially after the first sub-interval of time, and a third sub-interval of time is sequentially after the second sub-interval of time, wherein the particular sub-interval of time is the second sub-interval of time.

6. The method of claim 2, wherein the first traffic pattern comprises a duty cycle produced by stopping traffic transmitted via the identified port for a particular sub-interval of time within a predetermined interval of time.

7. The method of claim 6, wherein the predetermined interval of time comprises a first sub-interval of time and one or more second sub-intervals of time are sequentially after the first sub-interval of time, wherein the particular sub-interval of time is the first sub-interval of time.

8. The method of claim 6, wherein the predetermined interval of time comprises one or more first sub-intervals of time and a second sub-interval of time is sequentially after the one or more first sub-intervals of time, wherein the particular sub-interval of time is the second sub-interval of time.

9. The method of claim 1, further comprising:
  verifying the identified port is connected to the unauthorized wireless device by:
    applying respective policies to multiple ports on the network device, the multiple ports comprising the identified port, wherein the respective policies are configured to cause respective traffic patterns to be transmitted by respective devices connected to the multiple ports;
    detecting a first traffic pattern transmitted by the unauthorized wireless device;
    determining a respective degree of similarity between the first traffic pattern and each of the respective traffic patterns;
    determining, based on the respective degree of similarity, respective confidence levels for each of the multiple ports; and
    verifying the identified port is connected to the unauthorized wireless device when a respective confidence level associated with the identified port exceeds a threshold.

10. The method of claim 1, wherein at least two of the respective traffic patterns are different.

11. The method of claim 10, wherein a difference between the at least two of the respective traffic patterns is based on at least one of a respective duty cycle associated with each of the at least two of the respective traffic patterns and a length of a respective time interval associated with each of the at least two of the respective traffic patterns.

12. The method of claim 1, wherein the port policy is configured to limit throughput of the identified port, move traffic of the identified port to an isolated virtual local area network, add one or more firewall or security rules, reduce power to the identified port, or disable the identified port.

13. A system comprising:
  one or more processors; and
  at least one non-transitory computer-readable storage medium having stored therein instructions which, when executed by the one or more processors, cause the one or more processors to perform operations comprising:
    detecting an unauthorized wireless device has connected to an unknown port of a plurality of ports on a network device associated with a network;
    determining which of the plurality of ports on the network device is connected to the unauthorized wireless device by:
      generating one or more predetermined traffic patterns for output by the one or more of the plurality of ports;

determining one or more wireless traffic patterns transmitted by the unauthorized wireless device, wherein the one or more traffic patterns transmitted by the unauthorized wireless device are determined based at least in part on a previously determined identity information of the unauthorized wireless device;

matching, based on a threshold degree of similarity, the one or more wireless traffic patterns to at least one of the one or more predetermined traffic patterns to yield a match, the threshold degree of similarity including matching traffic patterns and similar traffic patterns, the similar traffic patterns including variable degrees of similarity and variable confidence levels based on the variable degrees of similarity;

based on the match, determining a particular port from the plurality of ports is associated with the at least one of the one or more predetermined traffic patterns is connected to the unauthorized wireless device;

selecting a port policy for the identified port; and applying the port policy to the identified port, wherein the port policy is configured to disconnect the unauthorized wireless device from the network.

14. The system of claim 13, the at least one non-transitory computer-readable storage medium having stored therein additional instructions which, when executed by the one or more processors, cause the one or more processors to perform operations comprising:

determining a confidence level associated with the determining the particular port is connected to the unauthorized wireless device, the determining of the confidence level comprising:

providing to one or more of the plurality of ports a respective signal configured to cause one or more respective traffic patterns to be provided to a respective device connected to the one or more of the plurality of ports, wherein the one or more of the plurality of ports comprises the particular port;

determining a wireless traffic pattern transmitted by the unauthorized wireless device;

determining a degree of similarity between the wireless traffic pattern transmitted by the unauthorized wireless device and a traffic pattern from the respective traffic patterns, the traffic pattern being associated with the particular port; and determining the confidence level based on the degree of similarity.

15. The system of claim 14, wherein each of the one or more respective traffic patterns comprises at least one of:

a modified throughput;

one or more predetermined sequences of packets; and one or more duty cycles, the one or more duty cycles generated by stopping or limiting traffic transmitted during a particular portion of a predetermined time interval.

16. The system of claim 13, wherein the port policy is configured to limit throughput of the particular port, move traffic of the particular port to an isolated virtual local area network, add one or more firewall or security rules to be applied to traffic associated with the particular port, reduce power to the particular port, or disable the particular port.

17. A non-transitory computer-readable storage medium having stored therein instructions which, when executed by a processor, cause the processor to perform operations comprising:

determining an unauthorized wireless device has connected to an unknown port of a plurality of ports on a network device associated with a network;

determining which of the plurality of ports on the network device the unauthorized wireless device has connected to, the determining comprising:

determining one or more predetermined traffic patterns for the one or more of the plurality of ports;

determining one or more wireless traffic patterns transmitted by the unauthorized wireless device, wherein the one or more traffic patterns transmitted by the unauthorized wireless device are determined based at least in part on a previously determined identity information of the unauthorized wireless device;

determining a degree of similarity between the one or more wireless traffic patterns and a traffic pattern from the one or more predetermined traffic patterns, to yield a match, the degree of similarity including matching traffic patterns and similar traffic patterns, the similar traffic patterns including variable degrees of similarity and variable confidence levels based on the variable degrees of similarity; and based on the match, determining a particular port from the plurality of ports is associated with the traffic pattern is connected to the unauthorized wireless device, to yield an identified port;

selecting a port policy for the identified port; and applying the port policy to the identified port, wherein the port policy is configured to disconnect the unauthorized wireless device from the network.

18. The non-transitory computer-readable storage medium of claim 17, wherein determining the one or more wireless traffic patterns transmitted by the unauthorized wireless device is based on one or more signals received from a second wireless device that has wirelessly detected the one or more wireless traffic patterns, the one or more signals comprising at least one of a message reporting the one or more wireless traffic patterns and traffic from the unauthorized wireless device detected by the second wireless device, the traffic from the unauthorized wireless device detected by the second wireless device being associated with the one or more wireless traffic patterns.

19. The non-transitory computer-readable storage medium of claim 17, storing additional instructions which, when executed by the processor, cause the processor to perform operations comprising:

determining a confidence level associated with the determining the particular port is connected to the unauthorized wireless device, the determining the confidence level comprising:

providing to one or more of the plurality of ports a respective signal configured to cause one or more respective traffic patterns to be provided to a respective device connected to the one or more of the plurality of ports, wherein the one or more of the plurality of ports comprises the particular port;

determining a wireless traffic pattern transmitted by the unauthorized wireless device; and determining the confidence level based on a respective degree of similarity between the one or more respective traffic patterns and the wireless traffic pattern, wherein the higher the respective degree of similarity the higher the confidence level determined for the particular port; and verifying the particular port is connected to the unauthorized wireless device when the confidence level exceeds a threshold.

20. The non-transitory computer-readable storage medium of claim 17, wherein the port policy is configured to:
- limit throughput of the particular port;
- move traffic associated with the particular port to an isolated virtual local area network;
- apply one or more firewall or security rules to traffic associated with the particular port;
- reduce power to the particular port; or
- disable the particular port.

* * * * *